United States Patent
Tohi et al.

(10) Patent No.: US 8,445,609 B2
(45) Date of Patent: May 21, 2013

(54) METHOD FOR PRODUCING OLEFIN POLYMER

(75) Inventors: Yasushi Tohi, Otake (JP); Ken Yoshitsugu, Otake (JP); Naoya Akiyama, Chiba (JP); Toshio Fujita, Takaishi (JP); Masatoshi Chinaka, Iwakuni (JP)

(73) Assignees: Mitsui Chemicals, Inc., Tokyo (JP); Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/265,122

(22) PCT Filed: Apr. 21, 2010

(86) PCT No.: PCT/JP2010/057087
§ 371 (c)(1),
(2), (4) Date: Oct. 18, 2011

(87) PCT Pub. No.: WO2010/123033
PCT Pub. Date: Oct. 28, 2010

(65) Prior Publication Data
US 2012/0041162 A1 Feb. 16, 2012

(30) Foreign Application Priority Data
Apr. 21, 2009 (JP) .................................. 2009-102968

(51) Int. Cl.
C08F 4/642 (2006.01)
C08F 4/649 (2006.01)
C08F 4/6592 (2006.01)
B01J 31/22 (2006.01)

(52) U.S. Cl.
USPC ........... 526/141; 526/160; 526/348; 526/943; 502/103; 502/124; 502/152

(58) Field of Classification Search
USPC .................. 526/141, 160, 348, 943; 502/103, 502/124, 152
See application file for complete search history.

(56) References Cited

U.S. PATENT DOCUMENTS

| | | | |
|---|---|---|---|
| 4,990,640 A | 2/1991 | Tsutsui et al. | |
| 5,017,714 A | 5/1991 | Welborn, Jr. | |
| 5,055,438 A | 10/1991 | Canich | |
| 5,120,867 A | 6/1992 | Welborn, Jr. | |
| 5,145,819 A | 9/1992 | Winter et al. | |
| 5,314,973 A | 5/1994 | Welborn, Jr. | |
| 5,321,106 A | 6/1994 | LaPointe | |
| 5,441,920 A | 8/1995 | Welborn, Jr. | |
| 5,561,092 A | 10/1996 | Ewen et al. | |
| 5,614,457 A | 3/1997 | Ewen et al. | |
| 5,663,249 A | 9/1997 | Ewen et al. | |
| 6,121,395 A | 9/2000 | Turner | |
| 6,197,902 B1 | 3/2001 | Dolle et al. | |
| 6,225,425 B1 | 5/2001 | Dolle et al. | |
| RE37,384 E | 9/2001 | Winter et al. | |
| 6,414,096 B1 | 7/2002 | Dolle et al. | |
| 6,444,603 B1 | 9/2002 | Tohi et al. | |
| 6,479,423 B1 | 11/2002 | Dolle et al. | |
| 6,689,829 B2 * | 2/2004 | Russell | 524/247 |
| 6,770,723 B2 | 8/2004 | Fujita et al. | |
| 6,875,718 B2 | 4/2005 | Fujita et al. | |
| 6,891,002 B2 | 5/2005 | Abe et al. | |
| 6,939,928 B1 | 9/2005 | Kawai et al. | |
| 7,300,903 B2 | 11/2007 | Fujita et al. | |
| 7,449,533 B2 | 11/2008 | Kawai et al. | |
| 2003/0181605 A1* | 9/2003 | Abe et al. | 526/68 |
| 2010/0029877 A1 | 2/2010 | Funaya et al. | |

FOREIGN PATENT DOCUMENTS

| | | |
|---|---|---|
| CN | 1224026 A | 7/1999 |
| EP | 1348719 A1 | 10/2003 |
| JP | 01-501950 A | 7/1989 |
| JP | 01-502036 A | 7/1989 |
| JP | 02-024701 A | 1/1990 |
| JP | 02-078687 A | 3/1990 |
| JP | 02-131488 | 5/1990 |
| JP | 02-167305 A | 6/1990 |
| JP | 03-009913 | 1/1991 |
| JP | 03-021607 | 1/1991 |
| JP | 03-103407 A | 4/1991 |
| JP | 03-106907 | 5/1991 |
| JP | 03-179005 A | 8/1991 |
| JP | 03-179006 A | 8/1991 |
| JP | 03-188092 | 8/1991 |
| JP | 03-207703 A | 9/1991 |
| JP | 03-207704 A | 9/1991 |
| JP | 04-069394 | 3/1992 |
| JP | 04-300887 | 10/1992 |
| JP | 11-315109 A | 11/1999 |
| JP | 2000-297114 | 10/2000 |
| JP | 2000-313717 | 11/2000 |
| JP | 2000-327707 | 11/2000 |
| JP | 2005-298662 | 10/2005 |
| WO | WO-01/27124 A1 | 4/2001 |
| WO | WO-2008/075717 A1 | 6/2008 |

OTHER PUBLICATIONS

Search Report received in International Application No. PCT/JP2010/057087 mailed Jul. 13, 2010.
Search Report received in European Application No. 10767090 dated Aug. 1, 2012.
Office Action Chinese Application No. 201080017662.X dated Jan. 4, 2013.

* cited by examiner

*Primary Examiner* — Caixia Lu
(74) *Attorney, Agent, or Firm* — Foley & Lardner LLP

(57) ABSTRACT

An object of the present invention is to provide a method for producing an olefin polymer, with which an olefin polymer having good particle properties can be produced in high activity, fouling inside the polymerization vessel, such as a vessel wall or an impeller, can be effectively prevented, and a long-term stable operation is achieved.

A method for producing an olefin polymer according to the present invention is characterized by including (co)polymerizing at least one olefin selected from the group consisting of ethylene and α-olefins having 3 to 20 carbon atoms in a polymerization vessel in the presence of (A) a solid catalyst component for olefin polymerization, (B) an aliphatic amide, and (C) an organoaluminum compound.

11 Claims, 2 Drawing Sheets

METHOD FOR PRODUCING OLEFIN POLYMER

TECHNICAL FIELD

The present invention relates to methods for producing olefin polymers. In particular, the present invention relates to a method for producing an olefin polymer, with which an olefin polymer having good particle properties can be produced in high activity and fouling inside polymerization vessels such as on vessel walls and impellers can be reduced.

BACKGROUND ART

Olefin polymers such as polyethylene, polypropylene, ethylene/α-olefin copolymers, and propylene/α-olefin copolymers are produced by (co)polymerizing olefins in the presence of an olefin polymerization catalyst such as a metallocene-based solid catalyst composed of a solid catalyst containing a metallocene compound of a group 4 metal such as zirconium and an organoaluminum component, for example.

However, in some cases, slurry polymerization of olefins in the presence of such a metallocene-based solid catalyst produces polymer masses and causes sheeting of polymers in the polymerization vessel and causes polymers to adhere to the impeller or vessel wall, thereby failing to achieve long-term stable operation. Gas-phase polymerization of olefins in the presence of such a metallocene-based solid catalyst in a fluidized bed reactor in some cases produces polymer masses and causes sheeting of polymers in the fluidized bed and decreases the flowability of polymer particles, thereby causing an inhomogeneous polymerization state in the fluidized bed and failing to achieve stable long-term continuous operation.

Chemical systems such as petroleum distillation refinery plants and polyolefin manufacturing plants suffer from problems of a decreased heat exchange capability and pipe clogging caused by fouling. This may lead to instability of manufacturing operation and, in worst cases, plant shutdown. Avoiding such situation is thus highly desirable.

In order to address these problems, for example, Patent Literature 1 (Hereinafter "Patent Literature" is referred to PTL, such as PTL 1) discloses a method in which a higher aliphatic amide is added to a powder flowing environment field for polyolefin production. However, according to this method, the activity of the polymerization catalyst used in polyolefin production decreases and the catalyst cost increases. PTL 2 discloses polymerization process that uses a catalyst constituted by a solid catalyst prepared by olefin prepolymerization and a surfactant supported on the solid catalyst. According to PTL 3, polymerization is conducted by feeding a surfactant during polymerization in the presence of a solid catalyst prepared by prepolymerization of olefins. However, although these techniques offer some effects of preventing adhesion of polymers to the impeller and vessel wall, the polymerization activity significantly decreases. An effective polymerization method that can achieve high activity while reducing the fouling on the vessel wall and the impeller has not yet been found.

CITATION LIST

Patent Literature

PTL 1: Japanese Unexamined Patent Application Publication No. 2000-313717

PTL 2: Japanese Unexamined Patent Application Publication No. 2000-297114

PTL 3: Japanese Unexamined Patent Application Publication No. 2000-327707

SUMMARY OF THE INVENTION

Technical Problem to be Solved

An object of the present invention is to provide a method for producing an olefin polymer with which an olefin-based polymer having good particle properties can be produced in high activity, fouling inside the polymerization vessel, such as on a vessel wall or an impeller, can be effectively prevented, and stable long-term operation is possible.

Solution to the Problem

A method for producing an olefin polymer according to the present invention is characterized in that in the presence of
(A) a solid catalyst component for olefin polymerization,
(B) an aliphatic amide, and
(C) an organoaluminum compound,
at least one olefin selected from the group consisting of ethylene and α-olefins having 3 to 20 carbon atoms is (co)polymerized in a polymerization vessel.

According to the method for producing an olefin polymer of the invention, the aliphatic amide (B) and the organoaluminum compound (C) are preferably preliminarily mixed with each other and then added to the polymerization vessel.

According to the method for producing an olefin polymer of the invention, the aliphatic amide (B) is preferably represented by general formula (I) below:

$$(C_mH_{2m+1}CO)N(CH_2CH_2OH)_2 \quad (I)$$

In the general formula (I), m denotes an integer of 1 to 30.

According to the method for producing an olefin polymer of the invention, the organoaluminum compound (C) is preferably represented by general formula (II) below:

$$R^a_m Al(OR^b)_n H_p \quad (II)$$

In the formula, $R^a$ and $R^b$ may be the same as or different from each other and each denote a hydrocarbon group having 1 to 20 and preferably 1 to 4 carbon atoms; m, n and p satisfy the relations; $0 < m \leq 3$; $0 \leq n < 3$, $0 \leq p < 3$, and $m+n+p=3$.

According to the method for producing an olefin polymer of the invention, the addition ratio (molar ratio), (C)/(B), of the organoaluminum compound (C) to the aliphatic amide (B) is preferably 0.01 to 4.0, more preferably 0.01 to 3.5, yet more preferably 0.01 to 3.2, still more preferably 0.01 to 3.0, yet still preferably 0.2 to 2.8, and most preferably 0.3 to 2.6.

According to the method for producing an olefin polymer of the invention,
the solid catalyst component for olefin polymerization
(A) is preferably composed of
(A-1) a compound of a transition metal selected from groups 3 to 12 in the periodic table,
(A-2) at least one compound selected from
 (a) an organometal compound,
 (b) an organoaluminoxy compound, and
 (c) a compound that forms an ion pair by reacting with (A-1), and
(A-3) a particulate carrier.

According to the method for producing an olefin polymer of the present invention, the (co)polymerization is preferably conducted in a suspension, a solution, or a gas phase.

Advantageous Effects of Invention

The present invention can provide a method for producing an olefin polymer, with which an olefin polymer having good particle properties can be produced in high polymerization activity, fouling inside a polymerization vessel such as on a vessel wall or an impeller can be effectively prevented, heat spots can be suppressed during polymerization, sheeting and generation of polymer masses can be prevented, and stable long-term olefin polymerization operation is achieved.

In other words, according to the present invention, (co)polymerization of olefins is conducted in a polymerization vessel containing both the aliphatic amide (B) and the organoaluminum compound (C) so that the decrease in polymerization activity of olefins is suppressed, the flowability inside the polymerization vessel is effectively ensured without decreasing the production rate of polymers, and polymers are prevented from adhering to the vessel wall or the impeller. Thus, long-term stable operation is possible with high activity, and an olefin polymer having good particle properties can be produced.

The olefin polymer production method of the present invention is applicable to a wide range of processes, such as suspension polymerization, solution polymerization, or gas-phase polymerization.

BRIEF DESCRIPTION OF DRAWINGS

FIG. 4-*a* is an image showing a rating C (Bad), FIG. 4-*b* is an image showing a rating B (Good), and FIG. 4-*c* is an image showing a rating A (Excellent).

DESCRIPTION OF EMBODIMENTS

Figure 1:
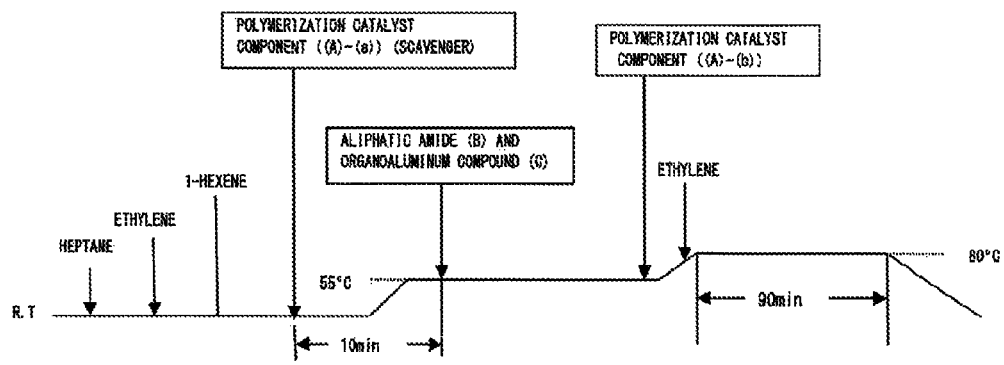
FIG. 1 shows a scheme of a process of a polymerization method (1) for evaluating the condition of a polymerization vessel inner wall during (co)polymerization in Examples and Comparative Examples.

The present invention will now be described in specific detail.

In the present invention, the word "(co)polymerization" is used to include both polymerization and copolymerization in its meaning. In the present invention, the word "polymer" may be used to represent not only a homopolymer but also a copolymer.

In the olefin polymer production method of the present invention, (co)polymerization of olefins is conducted in the presence of (A) a solid catalyst component for olefin polymerization, (B) an aliphatic amide, and (C) an organoaluminum compound. These components are individually described first.

(A) Solid Catalyst Component for Olefin Polymerization

Examples of the solid catalyst component for olefin polymerization (A) include solid catalyst components that contain compounds of transition metals selected from group 3 to group 12 elements in the periodic table. Specific examples thereof include a carrier-supported-type transition metal complex-based catalyst component in which a compound of group 4 to 6 transition metal in the periodic table is supported on a particle-shaped carrier, a solid titanium-based catalyst component composed of a solid titanium catalyst component and an organoaluminum compound, and a so-called Phillips catalyst component containing a chromium compound that can be oxidized into chromium trioxide, the chromium compound being supported on an inorganic oxide solid such as silica.

Among these, a carrier-supported-type metallocene-based catalyst component that belongs to a carrier-supported-type transition metal complex-based catalyst component is preferred. In particular, a carrier-supported-type metallocene catalyst component that contains (A-1) a compound of group 4 transition metal in the periodic table having a cyclopentadienyl skeleton, (A-2) at least one compound selected from (a) an organic metal compound, (b) an organoaluminoxy compound, and (c) a compound that forms an ion pair by reacting with the compound of group 4 transition metal in the periodic table having a cyclopentadienyl skeleton, and (A-3) a particulate carrier is preferable. A carrier-supported-type metallocene catalyst component that contains (A-1) a compound of group 4 transition metal in the periodic table having a cyclopentadienyl skeleton, (A-2) an organoaluminoxy compound, and (A-3) a particulate carrier is more preferable.

Carrier-supported-type transition metal complex-based catalyst component

Next, a carrier-supported-type transition metal complex-based catalyst component favorable for use as the solid catalyst component for olefin polymerization (A) in the present invention is described.

The carrier-supported-type transition metal complex-based catalyst component used as the component (A) of the present invention is preferably composed of (A-1) a compound of group 4-6 transition metal in the periodic table, (A-2) at least one compound selected from
  (a) an organometal compound,
  (b) an organoaluminoxy compound, and
  (c) a compound that forms an ion pair by reacting with (A-1), and (A-3) a particulate carrier.

Individual components (A-1) to (A-3) are described below.

[(A-1) Compound of Group 4-6 Transition Metal in the Periodic Table]

The transition metal compound used in the present invention is not particularly limited and may be any known compound of group 4-6 transition metal in the periodic table having an ability to polymerize olefins. Examples thereof include a halogenated, alkylated, or alkoxylated compound of group 4-6 transition metal in the periodic table and a cross-linking or non-cross-linking metallocene compound of a group 4-6 transition metal in the periodic table.

A halogenated, alkylated, or alkoxylated compound of group 4 transition metal in the periodic table or a cross-linking or non-cross-linking metallocene compound of a group 4 transition metal in the periodic table is more preferred. Examples of the transition metal compound (A) include halogenated transition metals, alkylated transition metals, and alkoxylated transition metals. Specific examples thereof include titanium tetrachloride, dimethyltitanium dichloride, tetrabenzyltitanium, tetrabenzylzirconium, and tetrabutoxytitanium.

Among the transition metal compounds listed as examples in the description above, a cross-linking or non-cross-linking metallocene compound is particularly preferable from the viewpoint of polymerization activity, etc. The cross-linking or non-cross-linking metallocene compound is a compound of group 4 transition metal in the periodic table having a cyclopentadienyl skeleton and examples thereof include compounds represented by general formula (III) below:

$$ML_x \qquad (III)$$

In general formula (III), M denotes a group 4 transition metal in the periodic table, e.g., zirconium, titanium or hafnium.

L is a ligand (group) that coordinates to the transition metal. At least one L is a ligand having a cyclopentadienyl skeleton and L other than the ligand having a cyclopentadienyl skeleton is a C1-C12 hydrocarbon group, an alkoxy group, an aryloxy group, a halogen atom, a trialkylsilyl group, —$SO_3R$ (where R is a C1-C8 hydrocarbon group which may have a substituent such as a halogen), or a hydrogen atom.

In the formula, x denotes a valence of the transition metal, i.e., the number of L.

Examples of the ligand having a cyclopentadienyl skeleton include a cyclopentadienyl group; alkyl-substituted cyclopentadienyl groups such as a methylcyclopentadienyl group, a dimethylcyclopentadienyl group, a trimethylcyclopentadienyl group, a tetramethylcyclopentadienyl group, a pentamethylcyclopentadienyl group, an ethylcyclopentadienyl group, a methylethylcyclopentadienyl group, a propylcyclopentadienyl group, a methylpropylcyclopentadienyl group, a butylcyclopentadienyl group, a methylbutylcyclopentadienyl group, and a hexylcyclopentadienyl group; an indenyl group; 4,5,6,7-tetrahydroindenyl group; and a fluorenyl group. These groups may be substituted with a halogen atom, a trialkylsilyl group, etc.

Among these ligands that coordinate to the transition metal, an alkyl-substituted cyclopentadienyl group is particularly preferable. When a compound represented by general formula (III) above contains two or more groups having a cyclopentadienyl skeleton, two of the groups having a cyclopentadienyl skeleton may be bonded with each other through an alkylene group such as ethylene and propylene; an alkylidene group such as isopropylidene and diphenylmethylene; a silylene group; or a substituted silylene group such as a dimethylsilylene group, a diphenylsilylene group, and a methylphenylsilylene group. The two or more groups having a cyclopentadienyl skeleton are preferably the same.

Examples of the ligand other than the ligand having a cyclopentadienyl skeleton are as follows: C1-C12 hydrocarbon groups such as alkyl groups, e.g., a methyl group, an ethyl group, a propyl group, an isopropyl group, a butyl group, and a pentyl group; cycloalkyl groups such as a cyclopentyl group and a cyclohexyl group; aryl groups such as a phenyl group and a tolyl group; and aralkyl groups such as a benzyl group and a neophyte group.

Examples of the alkoxy group include a methoxy group, an ethoxy group, and a butoxy group. Examples of the aryloxy group include a phenoxy group.

Examples of the halogen include fluorine, chlorine, bromine, and iodine. Examples of the ligand represented by —$SO_3R$ include a p-toluenesulfonate group, a methanesulfonate group, and a trifluoromethanesulfonate group.

The compound represented by the general formula (III) above is more particularly a compound represented by a general formula (III') below when the valence of the transition metal is 4, for example.

$$R^1R^2R^3R^4M \qquad (III')$$

(In the general formula (III'), M denotes zirconium, titanium or hafnium; $R^1$ denotes a group having a cyclopentadienyl skeleton; $R^2$, $R^3$, and $R^4$ may be the same or different and each denote a group having a cyclopentadienyl skeleton, an alkyl group, a cycloalkyl group, an aryl group, an aralkyl group, an alkoxy group, an aryloxy group, a halogen atom, a trialkylsilyl group, —$SO_3R$, or a hydrogen atom.)

In the invention, (A-1) is preferably a transition metal compound represented by the general formula (III') in which one of $R^2$, $R^3$, and $R^4$ denotes a group having a cyclopentadienyl skeleton, e.g., a transition metal compound in which $R^1$ and $R^2$ each denote a group having a cyclopentadienyl skeleton. These groups having cyclopentadienyl skeletons may be bonded with each other through an alkylene group, a substituted alkylene group, an alkylidene group, a silylene group, a substituted silylene group, or the like. $R^3$ and $R^4$ each denote an alkyl group, a cycloalkyl group, an aryl group, an aralkyl group, an alkoxy group, an aryloxy group, a halogen atom, a trialkylsilyl group, —$SO_3R$, or a hydrogen atom.

Specific examples of the transition metal compounds with M denoting zirconium are as follows: bis(indenyl)zirconium dichloride, bis(indenyl)zirconium dibromide, bis(indenyl)zirconium bis(p-toluenesulfonate), bis(4,5,6,7-tetrahydroindenyl) zirconium dichloride, bis(fluorenyl)zirconium dichloride, ethylenebis(indenyl)zirconium dichloride, ethylenebis(indenyl)zirconium dibromide, ethylenebis(indenyl) dimethylzirconium, ethylenebis(indenyl)diphenylzirconium, ethylenebis(indenyl)methylzirconium monochloride, ethylenebis(indenyl)zirconium bis(methanesulfonate), ethylenebis(indenyl)zirconium bis(p-toluenesulfonate), ethylenebis(indenyl)zirconium bis(trifluoromethanesulfonate), ethylenebis(4,5,6,7-tetrahydroindenyl)zirconium dichloride, isopropylidene(cyclopentadienyl-fluorenyl)zirconium dichloride, isopropylidene(cyclopentadienyl-methylcyclopentadienyl)zirconium dichloride, dimethylsilylenebis(cyclopentadienyl)zirconium dichloride, dimethylsilylenebis(methylcyclopentadienyl)zirconium dichloride, dimethylsilylenebis(dimethylcyclopentadienyl)zirconium dichloride, dimethylsilylenebis(trimethylcyclopentadienyl)zirconium dichloride, dimethylsilylenebis(indenyl)zirconium dichloride, dimethylsilylenebis(indenyl)zirconium bis(trifluoromethanesulfonate), rac-dimethylsilylenebis{1-(2-methyl-4,5-acenaphthocyclopentadienyl)}zirconium dichloride, rac-dimethylsilylenebis{1-(2-methyl-4,5-benzoindenyl)}zirconium dichloride, rac-dimethylsilylenebis{1-(2-methyl-4-isopropyl-7-methylindenyl)}zirconium dichloride, rac-dimethylsilylenebis{1-(2-methyl-4-phenylindenyl)}zirconium dichloride, rac-dimethylsilylenebis{1-(2-methylindenyl)}zirconium dichloride, dimethylsilylenebis(4,5,6,7-tetrahydroindenyl) zirconium dichloride, dimethylsilylene(cyclopentadienyl-fluorenyl)zirconium dichloride, diphenylsilylenebis(indenyl) zirconium dichloride, methylphenylsilylenebis(indenyl) zirconium dichloride, bis(cyclopentadienyl)zirconium dichloride, bis(cyclopentadienyl)zirconium dibromide, bis(cyclopentadienyl)methylzirconium monochloride, bis(cyclopentadienyl)ethylzirconium monochloride, bis(cyclopentadienyl)cyclohexylzirconium monochloride, bis(cyclopentadienyl)phenylzirconium monochloride, bis(cyclopentadienyl)benzylzirconium monochloride, bis(cyclopentadienyl)zirconium monochloride monohydride, bis(cyclopentadienyl)methylzirconium monohydride, bis(cyclopentadienyl)dimethylzirconium, bis(cyclopentadienyl)diphenylzirconium, bis(cyclopentadienyl)dibenzylzirconium, bis(cyclopentadienyl)zirconium methoxychloride, bis(cyclopentadienyl)zirconium ethoxychloride, bis(cyclopentadienyl)zirconium bis(methanesulfonate), bis(cyclopentadienyl)zirconium bis(p-toluenesulfonate), bis(cyclopentadienyl)zirconium bis(trifluoromethanesulfonate), bis(methylcyclopentadienyl)zirconium dichloride, bis(dimethylcyclopentadienyl)zirconium dichloride, bis(dimethylcyclopentadienyl)zirconium ethoxychloride, bis (dimethylcyclopentadienyl)zirconium bis(trifluoromethanesulfonate), bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(methylbutylcyclopentadienyl)zirconium bis(methanesulfonate), bis(trimethylcyclopentadienyl)zirconium dichloride, bis(tetramethylcyclopentadienyl)zirconium dichloride, bis(pentamethylcyclopentadienyl)zirconium dichloride, bis(hexylcyclopentadienyl)zirconium dichloride, and bis(trimethylsilylcyclopentadienyl)zirconium dichloride.

In the examples listed above, the disubstituted cyclopentadienyl ring includes a 1,2-substituted cyclopentadienyl and a 1,3-substituted cyclopentadienyl and the trisubstituted cyclopentadienyl ring includes 1,2,3- and 1,2,4-substituted cyclopentadienyl. Alkyl groups such as propyl and butyl include isomers such as n-, i-, sec-, and tert-isomers.

In the present invention, a transition metal compound in which zirconium metal in the above-described zirconium compound is replaced by a titanium metal or a hafnium metal may be used. In addition to the titanium and hafnium compounds having similar steric structures and bromides and iodides thereof, transition metal compounds described in Japanese Unexamined Patent Application Publication Nos. H3-9913, H2-131488, H3-21607, H3-106907, H3-188092, H4-69394, and H4-300887 and WO01/27124A1 may also be used.

The transition metal compound may be a transition metal compound represented by a general formula (IV) below described in Japanese Unexamined Patent Application Publication No. H11-315109.

[Chem. 1]

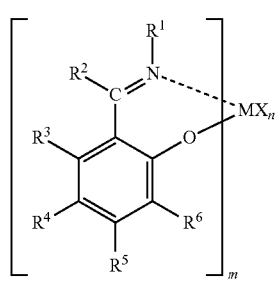

(IV)

In the formula, M denotes a group 4-6 transition metal atom in the periodic table, m denotes an integer of 1 to 6, and $R^1$ to $R^6$ may be the same or different and each denote a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group. Two or more of $R^1$ to $R^6$ may be bonded with each other to form a ring.

When m is 2 or more, two of the groups denoted by $R^1$ to $R^6$ may be bonded with each other (however, $R^1$ is never bonded to $R^1$).

The subscript n is a number that satisfies the valence of M.

X denotes a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group. When n is 2 or more, the groups denoted by X may be the same or different and may be bonded with each other to form a ring.

[Component (A-2)]

The component (A-2) that constitutes the carrier-supported-type transition metal complex-based catalyst component is at least one compound selected from (a) an organic metal compound, (b) an organoaluminoxy compound, and (c) a compound that forms an ion pair by reacting with (A-1).

(a) Organometal Compound

Organometal compounds that contains metal elements of group 1, 2, 12, and 13 in the periodic table represented by general formulae (V), (VI), and (VII) below are used as the (a) organometal compound used in the present invention.

An organoaluminum compound represented by

(V)

In the formula, $R^a$ and $R^b$ may be the same or different and each denote a hydrocarbon group having 1 to 15 and preferably 1 to 4 carbon atoms, X denotes a halogen atom, m, n, p and q satisfy the relations; $0<m\leq3, 0\leq n<3, 0\leq p<3, 0\leq q<3$, and $m+n+p+q=3$. Examples of such a compound include trimethylaluminum, triethylaluminum, triisobutylaluminum, and diisobutylaluminum hydride.

An alkylated complex of aluminum and a group 1 metal in the periodic table represented by a general formula

(VI)

In the formula, $M^2$ denotes Li, Na, or K and $R^a$ denotes a hydrocarbon group having 1 to 15 carbon atoms and preferably to 4 carbon atoms. Examples of such a compound include $LiAl(C_2H_5)_4$ and $LiAl(C_7H_{15})_4$.

A dialkyl compound of a group 2 or 12 metal in the periodic table represented by general formula

(VII)

In the formula, $R^a$ and $R^b$ may be the same or different and each denote a hydrocarbon group having 1 to 15 carbon atoms and preferably 1 to 4 carbon atoms, and $M^3$ denotes Mg, Zn, or Cd.

Among the organometal compounds described above, organoaluminum compounds are preferred. The organic metal compounds may be used alone or in combination of two or more.

(b) Organoaluminoxy Compound

A known aluminoxane may be used as the organoaluminoxy compound. Specific examples thereof include compounds represented by general formulae (VIII) and/or (IX).

[Chem. 2]

(VIII)

[Chem. 3]

(IX)

In general formulae (VIII) and (IX), R denotes a hydrocarbon group having 1 to 10 carbon atoms and n denotes an integer of 2 or more.

Methylaluminoxanes represented by general formulae (VIII) and (IX) with R denoting a methyl group and n denoting or more and preferably 10 or more are preferred as the organoaluminoxy compound. Slight amount of organoaluminum compounds contained in these aluminoxanes may cause no problem. An organoaluminoxy compound insoluble in benzene, which is, for example, described in Japanese Unexamined Patent Application Publication No. 2-78687, may also be used as the organoaluminoxy compound. Organoaluminoxy compounds described in Japanese Unexamined Patent Application Publication No. 2-167305, and aluminoxanes having two or more types of alkyl groups and the like described in Japanese Unexamined Patent Application Publication Nos. 2-24701 and 3-103407 are also suited for the use.

Such known aluminoxanes can be produced by the methods (1) to (3) below, for example, and are usually obtained as solutions in hydrocarbon solvents.

(1) A method that includes adding an organoaluminum compound, such as trialkylaluminum, to a hydrocarbon medium suspension of a compound containing adsorbed water or a salt containing crystal water, such as magnesium chloride hydrates, copper sulfate hydrates, aluminum sulfate hydrates, nickel sulfate hydrates, and serous chloride hydrates, and allowing the organoaluminum compound to react with adsorbed water or crystal water.

(2) A method that includes causing water, ice, or steam to directly act on an organoaluminum compound, such as trialkylaluminum, in a medium such as benzene, toluene, ethyl ether, and tetrahydrofuran.

(3) A method that includes causing an organic tin oxide, such as dimethyltin oxide and dibutyltin oxide, to react with an organoaluminum compound such as trialkylaluminum in a medium such as decane, benzene, and toluene.

The aluminoxanes may contain a slight amount of organometal components. Solutions of aluminoxanes that have been recovered may be subjected to distillation to remove the solvents or unreacted organoaluminum compounds and then the products may be used again by dissolving in solvents.

Specific examples of the organoaluminum compounds used in preparing aluminoxanes include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, and tridecylaluminum; tricycloalkylaluminum such as tricyclohexylaluminum and tricyclooctylaluminum; dialkylaluminum halides such as dimethylaluminum chloride, diethylaluminum chloride, diethylaluminum bromide, and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Among these, trialkylaluminum and tricycloalkylaluminum are particularly preferred. An isoprenylaluminum represented by a general formula (X) below may be used as the organoaluminum compound:

$(i\text{-}C_4H_9)_x Al_y (C_5H_{10})_z$ (X)

In the general formula (X), x, y, and z each denote a positive number and $z \geq 2x$.

The above-described organoaluminum compounds may be used alone or in combination of two or more. Examples of the solvent used in preparing aluminoxanes include aromatic hydrocarbons such as benzene, toluene, xylene, cumene, and cymene, aliphatic hydrocarbons such as pentane, hexane, heptane, octane, decane, dodecane, hexadecane, and octadecane, alicyclic hydrocarbons such as cyclopentane, cyclohexane, cyclooctane, and methylcyclopentane, petroleum fractions such as gasoline, kerosene, and light gas oil, and halides of the above-described aromatic, aliphatic, and alicyclic hydrocarbons and more particularly chlorides and bromides thereof. Ethers such as ethyl ether and tetrahydrofuran may also be used. Among these solvents, aromatic hydrocarbons are particularly preferable.

The organoaluminoxy compounds such as aluminoxanes and organoaluminoxy compounds described above are used alone or in combination of two or more.

(c) Compound that Forms an Ion Pair by Reacting with (A-1)

Examples of the compound that forms an ion pair by reacting with the group 4-6 transition metal compound (A-1) according to the present invention (hereinafter this compound is referred to as "ionized ionic compound") include Lewis acids, ionic compounds, borane compounds, and carborane compounds described in Japanese Unexamined Patent Application Publication Nos. H1-501950, H1-502036, H3-179005, H3-179006, H3-207703, and H3-207704 and U.S. Pat. No. 5,321,106. Examples of the compound further include heteropoly compounds and isopoly compounds. Such ionized ionic compounds may be used alone or in combination of two or more.

Among the organometal compound (a), the organoaluminoxy compound (b), and the compound that forms an ion pair by reacting with (A-1) (C) from which the compound (A-2) is selected, the organoaluminoxy compound (b) is particularly preferable in the present invention.

[(A-3) Particulate Carrier]

Specific examples of the particulate carrier (A-3) include inorganic metal oxide carriers such as $SiO_2$, $Al_2O_3$, $MgO$, $ZrO_2$, $TiO_2$, $B_2O_3$, $CaO$, $ZnO$, $BaO$, $ThO_2$, and mixtures thereof, e.g., $SiO_2$—$MgO$, $SiO_2$—$Al_2O_3$, $SiO_2$—$TiO_2$, $SiO_2$—$V_2O_5$, $SiO_2$—$Cr_2O_3$, and $SiO_2$—$TiO_2$—$MgO$, inorganic chlorides carriers such as $MgCl_2$, $MgBr_2$, $MnCl_2$, and $MnBr_2$, and organic carriers such as polyethylene, polypropylene, poly-1-butene, poly-4-methyl-1-pentene, and styrene-divinylbenzene copolymers. Clays, clay minerals which are components of clays, and ion exchanging layered compounds may be used as inorganic carriers.

The inorganic compound carriers preferably have an average particle diameter in the range of 1 to 300 μm and preferably in the range of 3 to 200 μm. Such carriers are fired at 100° C. to 1000° C. and preferably 150° C. to 700° C. according to needs and used.

The inorganic chlorides may be used as they are or after being pulverized in a ball mill or a vibrating mill. An inorganic chloride may be dissolved in a solvent such as alcohol and then precipitated into fine particles with a precipitating agent.

A clay used in the present invention usually contains a clay mineral as a main component. An ion exchanging layered compound used in the present invention is a compound that has a crystal structure including layers that are constituted by ion bonding and stacked in parallel with each other with weak binding force and that contain ions that are exchangeable. Most of clay minerals are ion exchanging layered compounds. The clay, clay mineral, and ion exchanging layered compound that can be used may be natural or synthetic products. Examples of the clay, clay mineral, and ion exchanging layered compound include clays, clay minerals, and ion crystal compounds having layered crystal structures such as a hexagonal closest packing structure, an antimony structure, a $CdCl_2$ structure, and a $CdI_2$ structure. Examples of such clays and clay minerals include kaolin, bentonite, kibosh clay, gairome clay, allophane, hisingerite, pyrophylite, micas, montmorillonites, vermiculite, chlorites, palygorskite, kaolinite, nakhlite, dickite, and halloysite. Examples of the ion exchanging layered compound include crystalline acid salts of multivalent metals such as $\alpha$-Zr(HAsO$_4$)$_2$.H$_2$O, $\alpha$-Zr (HPO$_4$)$_2$, $\alpha$-Zr(KPO$_4$)$_2$.3H$_2$O, $\alpha$-Ti(HPO$_4$)$_2$, $\alpha$-Ti(HAsO$_4$)$_2$. H$_2$O, $\alpha$—Sn(HPO$_4$)$_2$.H$_2$O, $\gamma$-Zr (HPO$_4$)$_2$, $\gamma$-Ti(HPO$_4$)$_2$, and $\gamma$-Ti (NH$_4$PO$_4$)$_2$.H$_2$O. The clay and clay mineral used in the present invention are preferably chemically treated. Examples of chemical treatment include, e.g., surface treatment for removing impurities adhered to a surface and treatment that affects the crystal structure of the clay and the like. Specific examples of the chemical treatment include acid treatment, alkali treatment, salt treatment, and organic substance treatment.

The ion exchanging layered compound used in the present invention may be a layered compound having a increased layer-to-layer distance by utilizing the ion exchanging property, i.e., exchanging the interlayer exchanging ions with other bulky ions. Such bulky ions function as pillars that support the layered structure and are usually called "pillars". Introduction of another substance between layers of the layered compound is called "intercalation". Examples of the guest compound to be intercalated include cationic inorganic compounds such as TiCl$_4$ and ZrCl$_4$, metal alkoxides such as Ti(OR)$_4$, Zr(OR)$_4$, PO(OR)$_3$, and B(OR)$_3$ (R denotes a hydrocarbon group or the like), and metal hydroxide ions such as [Al$_{13}$O$_4$(OH)$_{24}$]$^{7+}$, [Zr$_4$(OH)$_{14}$]$^{2+}$, and [Fe$_3$O (OCOCH$_3$)$_6$]$^+$. These compounds are used alone or in combination of two or more. Intercalation of these compounds may be conducted in the presence of a polymer obtained by hydrolysis of a metal alkoxide such as Si(OR)$_4$, Al(OR)$_3$, Ge(OR)$_4$ (R denotes a hydrocarbon group or the like), a colloidal inorganic compound such as SiO$_2$, or the like. The pillar may be an oxide produced by intercalating the metal hydroxide ions between layers and performing thermal dehydration. Of these, clays and clay minerals are preferable. Montmorillonite, vermiculite, pectolite, taeniolite, and synthetic mica are particularly preferable.

Examples of the organic compound used in the organic carrier include granular or fine particle solids having a grain diameter in the range of 1 to 300 μm. As mentioned already, specific examples thereof include (co)polymers produced from α-olefins having 2 to 14 carbon atoms as main components, such as ethylene, propylene, 1-butene, and 4-methyl-1-pentene, (co)polymers produced from vinyl cyclohexane and/or styrene as a main component, and modified products thereof.

[Carrier-Supported-Type Metallocene-Based Catalyst Component]

A carrier-supported-type metallocene-based catalyst component, which is one of the materials preferred for use as a solid catalyst component for olefin polymerization (A) used in the present invention will now be described.

A carrier-supported-type metallocene-based catalyst component is a catalyst component in which a metallocene-based transition metal compound is supported on a carrier. Preferably, the catalyst component contains the group 4 transition metal compound having a cyclopentadienyl skeleton (A-1) and the organoaluminoxy compound (b) (A-2) which are supported on the particulate carrier (A-3).

Such a carrier-supported-type metallocene-based catalyst component can be prepared by mixing and bringing into contact a compound of the group 4 transition metal having a cyclopentadienyl skeleton (A-1), an organoaluminoxy compound (b) (A-2), and a particulate carrier (A-3). The order in which the respective components are brought into contact with one another is selected as desired.

Specific examples of inert hydrocarbon solvents used in preparation of the carrier-supported-type metallocene-based catalyst component include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof.

In preparing a carrier-supported-type metallocene-based catalyst component, the amount of the transition metal compound (A-1) used on a transition metal atom basis is usually 0.001 to 1.0 mmol and preferably 0.005 to 0.5 mmol and the amount of the organoaluminoxy compound (b) (A-2) used on an aluminum atom basis is usually 0.1 to 100 mmol and preferably 0.5 to 20 mmol per gram of the particulate carrier (A-3). When the organoaluminum compound (C) is used, it is used in an amount of usually 0.001 to 1000 mmol and preferably 2 to 500 mmol per gram of the particulate carrier (A-3).

The temperature at which the individual components are mixed and contacted one another is usually −50° C. to 150° C. and preferably −20° C. to 120° C., and the period of contact is 1 to 1000 minutes and preferably 5 to 600 minutes.

In the carrier-supported-type metallocene-based catalyst component obtained as such, about $5\times10^{-6}$ to $10^{-3}$ mol and preferably $10^{-5}$ to $3\times10^{-4}$ mol of the transition metal compound (A-1) on a transition metal atom basis is supported and about $10^{-3}$ to $10^{-1}$ mol and preferably $2\times10^{-3}$ to $5\times10^{-2}$ mol of the organoaluminoxy compound (b) (A-2) on an aluminum atom basis is supported per gram of the fine particulate support (A-3).

The solid catalyst component for olefin polymerization (A) used in the present invention may be a prepolymerized catalyst component in which olefins are preliminarily polymerized. A prepolymerized catalyst is composed of the catalyst for olefin polymerization (A) and, if needed, an olefin polymer produced by prepolymerization (D).

The prepolymerized catalyst may include the transition metal compound (A-1), the organoaluminoxy compound (b) (A-2), and the particulate carrier (A-3). Olefin polymer produced by prepolymerization (D) may be included, if needed.

An example of a method for preparing such a prepolymerized catalyst is a method that includes preliminarily polymerizing a small amount of an olefin with a solid catalyst component produced by mixing and bringing into contact a transition metal compound (A-1), an organoaluminoxy compound (b) (A-2), and a particulate carrier (A-3) in an inert hydrocarbon solvent or an olefin medium. Examples of the inert hydrocarbon solvent used in preparing the prepolymerized catalyst are the same as those of the inert hydrocarbon solvent used in preparing the carrier-supported-type metallocene-based catalyst component described above.

The olefin used in prepolymerization contains 100 to 0 mol % of ethylene, 0 to 49 mol % of propylene, and 0 to 100 mol % of an olefin having 4 or more carbon atoms, preferably 100 to 0 mol % of ethylene, 0 to 20 mol % of propylene, and 0 to 100 mol % of an olefin having 4 or more carbon atoms, more preferably 100 to 20 mol % of ethylene, 0 to 20 mol % of propylene, and 0 to 80 mol % of an olefin having 4 or more carbon atoms, and particularly preferably 100 to 20 mol % of ethylene and 0 to 80 mol % of an olefin having 4 or more carbon atoms.

Examples of the olefin having 4 or more carbon atoms include α-olefins having 4 to 20 carbon atoms such as 1-butene, 1-pentene, 1-hexene, 4-methyl-1-pentene, 1-octene, 1-decene, 1-dodecene, 1-tetradecene, 1-hexadecene, 1-octadecene, and 1-eicosene.

Furthermore, cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene, vinylcyclohexane, and dienes may also be used.

In preparing the prepolymerized catalyst, usually 0.001 to 1.0 mmol and preferably 0.005 to 0.5 mmol of the transition metal compound (A-1) on a transition metal atom basis is used and usually 0.1 to 100 mmol and preferably 0.5 to 20 mmol of the organoaluminoxy compound (b) (A-2) on an aluminum atom basis is used per gram of the particulate carrier (A-3).

In the prepolymerized catalyst obtained as such, about $5 \times 10^{-6}$ to $10^{-3}$ mol and preferably $10^{-5}$ to $3 \times 10^{-4}$ mol of the transition metal compound (A-1) on a transition metal atom basis is supported and about $10^{-3}$ to $10^{-1}$ mol and preferably $2 \times 10^{-3}$ to $5 \times 10^{-2}$ mol of the organoaluminoxy compound (b) (A-2) on an aluminum atom basis is supported, and about 0.1 to 500 g, preferably 0.3 to 300 g, and more preferably 1 to 100 g of the olefin polymer (D) produced by prepolymerization is supported per gram of the particulate carrier (A-3).

The solid catalyst component for olefin polymerization (A) used in the present invention may contain components useful for polymerization other than the components described above. Such a catalyst for olefin polymerization used in the present invention can polymerize the olefin in a high polymerization activity.

If needed, the carrier-supported-type metallocene-based catalyst component may contain (E) an organoaluminum compound or a nonionic surfactant which is added during synthesis of the catalyst or the prepolymerization.

(E) Organoaluminum Compound

Examples of the organoaluminum compound (E) that can be used in the present invention as needed include compounds represented by general formulae (XI), (XII), and (XIII) below.

An organoaluminum compound represented by $$R^a_m Al(OR^b)_n H_p X_q \quad (XI)$$

In the formula, $R^a$ and $R^b$ may be the same or different and each denote a hydrocarbon group having 1 to 15 and preferably 1 to 4 carbon atoms, X denotes a halogen atom, m, n, p, and q satisfy the relations; $0 < m \leq 3$, $0 \leq n \leq 3$, $0 \leq p < 3$, $0 \leq q < 3$, and $m+n+p+q=3$.

Examples thereof include tri-n-alkyl aluminum such as trimethylaluminum, triethylaluminum, tri-n-butylaluminum, tripropylaluminum, tripentylaluminum, trihexylaluminum, trioctylaluminum, and tridecylaluminum; tri-branched alkyl aluminum such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum; tricycloalkylaluminum such as tricyclohexylaluminum and tricyclooctylaluminum; triarylaluminum such as triphenylaluminum and tritolylaluminum; and dialkylaluminum hydrides such as diisopropylaluminum hydride and diisobutylaluminum hydride.

Alkenylaluminum represented by $$(i\text{-}C_4H_9)_x Al_y (C_5H_{10})_z \quad (XII)$$

(In the formula, x, y, and z are each a positive number and $z \geq 2x$) such as isoprenylaluminum, alkylaluminum alkoxides such as isobutylaluminum methoxide, isobutylaluminum ethoxide, and isobutylaluminum isopropoxide, dialkylaluminum alkoxides such as dimethylaluminum methoxide, diethylaluminum ethoxide, and dibutylaluminum butoxide, and alkylaluminum, and alkylaluminum sesquialkoxides such as ethylaluminum sesquiethoxide and butylaluminum sesquibutoxide.

A partially alkoxylated alkyl aluminum having an average composition represented by $$R^a_{2.5} Al(OR^b)_{0.5} \quad (XIII)$$

in the formula, $R^a$ and $R^b$ may be the same or different and each denote a hydrocarbon group having 1 to 15 and preferably 1 to 4 carbon atoms, alkylaluminum aryloxides such as diethylaluminum phenoxide, diethylaluminum (2,6-di-t-butyl-4-methyl phenoxide), ethylaluminum bis(2,6-di-t-butyl-4-methyl phenoxide), diisobutylaluminum (2,6-di-t-butyl-4-methyl phenoxide), and isobutylaluminum bis(2,6-di-t-butyl-4-methyl phenoxide), dialkylaluminum halides such as dimethylaluminum chloride, diethylaluminum chloride, dibutylaluminum chloride, diethylaluminum bromide, and diisobutylaluminum chloride, alkylaluminum sesquihalides such as ethylaluminum sesquichloride, butylaluminum sesquichloride, and ethylaluminum sesquibromide, partially halogenated alkylaluminum such alkylaluminum dihalides, e.g., ethylaluminum dichloride, propylaluminum dichloride, and butylaluminum dibromide, dialkylaluminum hydrides such as diethylaluminum hydride and dibutylaluminum hydride, other partially hydrogenated alkylaluminum such as alkylaluminum dihydrides, e.g., ethylaluminum dihydride and propylaluminum dihydride, and partially alkoxylated and halogenated alkylaluminum such as ethylaluminum ethoxychloride, butylaluminum butoxychloride, and ethylaluminum ethoxybromide.

Compounds similar to the above-described organoaluminum compound can also be used. Examples thereof include an organoaluminum compound including two or more aluminum compounds bonded through a nitrogen atom. Specific examples of such a compound include $(C_2H_5)_2 AlN(C_2H_5)Al(C_2H_5)_2$. Triethylaluminum and triisobutylaluminum are preferable.

When the organoaluminum compound (E) is used, it is used in an amount of usually 0.001 to 1000 mmol and preferably 0.01 to 500 mmol per gram of the particulate carrier (A-3).

An aliphatic amide described below or an ester-type, ether-type, ethoxylate-type, or polyethylene glycol-type nonionic surfactant may be used as the nonionic surfactant. The nonionic surfactant is used in an amount of 0.1 to 20 parts by weight, preferably 0.15 to 20 parts by weight, and more preferably 0.2 to 5 parts by weight relative to 100 parts by weight of the solid catalyst component prepared by mixing and bringing into contact (A-1), (A-2), and (A-3) with one another.

(B) Aliphatic Amide

The aliphatic amide (B) used in the present invention is a conventional nonionic surfactant and any known aliphatic amide may be used without any limitations. Preferred examples of the aliphatic amide (B) include compounds represented by general formula (I) below.

$$(C_m H_{2m+1} CO)N(CH_2CH_2OH)_2 \quad (I)$$

In general formula (I), m denoting the number of carbon atoms in the alkyl group represented by $(C_m H_{2m+1})$ is in the range of 1 to 30, preferably 6 to 20, and more preferably 8 to 18.

Examples of the aliphatic amide (B) suited for use in the present invention include higher aliphatic amides such as lauryl diethanolamide, cetyl diethanolamide, stearyl diethanolamide, octyl diethanolamide, nonyl diethanolamide, and sec-lauryl diethanolamide. Among these, lauryl diethanolamide is preferred.

A large number of ester-type, ether-type, ethoxylate-type, and polyethylene glycol-type compounds that function as nonionic surfactants are known. In this invention, the aliphatic amide represented by the general formula (I) above is particularly preferable to achieve the effects of the invention.

(C) Organoaluminum Compound

While any known organoaluminum can be used without any limitation as the organoaluminum compound (C) in the present invention, compounds represented by the general formula (II) below are preferred.

$$R^a_m Al(OR^b)_n H_p \qquad (II)$$

In the formula, $R^a$ and $R^b$ may be the same or different and each denote a hydrocarbon group having 1 to 20 and preferably 1 to 4 carbon atoms, m, n, and p satisfy the relations; $0<m\leq 3$, $0\leq n<3$, $0\leq p<3$, and $m+n+p=3$.

Specific examples of the compound represented by the general formula (II) above include tri-n-alkyl aluminum such as trimethylaluminum, triethylaluminum, tri-n-butylaluminum, tripropylaluminum, tripentylaluminum, trihexylaluminum, trioctylaluminum, and tridecylaluminum, tri-branched-alkylaluminum such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum, tricycloalkylaluminum such as tricyclohexylaluminum and tricyclooctylaluminum, triarylaluminum such as triphenylaluminum and tritolylaluminum, and dialkylaluminum hydrides such as diisopropylaluminum hydride and diisobutylaluminum hydride.

Of the compounds represented by the general formula (II), a compound with p denoting 0 represented by the general formula (II-a) below is particularly preferable.

$$R^a_m Al(OR^b)_n \qquad (II-a)$$

In the general formula (II-a), $R^a$ denotes a hydrocarbon group having 1 to 20 carbon atoms, $R^b$ denotes a hydrocarbon group having 1 to 20 carbon atoms, m denotes an integer of 0 to 3, n denotes an integer of 0 to 3, and m+n is 3.

Examples of the organoaluminum compound represented by the general formula (II-a) include trialkylaluminum such as trimethylaluminum, triethylaluminum, triisopropylaluminum, triisobutylaluminum, trioctylaluminum, and tri-2-ethylhexylaluminum; alkenylaluminum such as isoprenylaluminum, and alkoxyaluminum such as dimethylaluminum methoxide, diethylaluminum ethoxide, diisobutylaluminum methoxide, triethylaluminum, and triisobutylaluminum.

Among the organoaluminum compounds represented by the general formula (II-a) above, a compound having substituting hydrocarbon groups with many carbon atoms, e.g., a compound with $R^a$ denoting a C6-C20 hydrocarbon group and $R^b$ denoting a C6-C20 hydrocarbon group, is preferable since such a compound does not readily cause a decrease in activity of the catalyst even when it is charged into a polymerization system. A compound having substituting hydrocarbon groups with fewer carbon atoms, such as a compound with $R^a$ denoting a C1-C4 hydrocarbon group and $R^b$ denoting a C1-C4 hydrocarbon group, is preferred for reducing the cost of the compound since the molar amount of the compound per unit weight is high and thus the effect of the invention is achieved by addition of the compound in a small amount. A compound with $R^a$ denoting a C1-C4 hydrocarbon group and $R^b$ denoting a C1-C4 hydrocarbon group is favorably used in gas-phase polymerization since the weight of the compound per unit mole is small. The hydrocarbon groups are preferably alkyl groups. Preferably, m is 2 or 3 and n is 0 or 1. Considering together the cost reduction, the activity improving effect, and operability, a compound with $R^a$ denoting a C1-C8 hydrocarbon group and $R^b$ denoting a C1-C8 hydrocarbon group is preferable and a compound with $R^a$ denoting an ethyl group, $R^b$ denoting an ethyl group, m=2, and n=1 is more preferable.

Production of Olefin Polymer

According to the method for producing an olefin polymer of the present invention, one or more types of olefins are (co)polymerized in a polymerization vessel in the presence of the solid catalyst component for olefin polymerization (A), the aliphatic amide (B), and the organoaluminum compound (C).

The method of adding the solid catalyst component for olefin polymerization (A), the aliphatic amide (B), and the organoaluminum compound (C) during the (co)polymerization may be freely selected. Examples of the method are as follows.

i) Charging (B) and then (C) into the polymerization vessel separately.

ii) Charging (C) and then (B) into the polymerization vessel separately.

iii) Mixing and bringing into contact (B) and (C) with each other without or in a solvent and then charging the resulting mixture into the polymerization vessel.

iv) Mixing and bringing into contact (B) and (C) with each other without or in a solvent and then charging the resulting mixture and additional (B) into the polymerization vessel.

v) Mixing and bringing into contact (B) and (C) with each other without or in a solvent and then charging the resulting mixture and additional (C) into the polymerization vessel.

The method of adding the solid catalyst component for olefin polymerization (A) may be any. (B) and (C) may be added according to any one of the methods i) to v) after (A) is added, or (A) may be added after (B) and (C) are added according to any one of the methods i) to v). A preferred method is to mix and bring into contact (B) and (C) with each other without or in a solvent, charge the mixture into the polymerization vessel, and add (A) thereto.

The addition ratio of the organoaluminum compound (C) to the aliphatic amide (B) may be any. In particular, a molar ratio (C)/(B) is 0.01 to 4.0, preferably 0.01 to 3.5, more preferably 0.01 to 3.2, yet more preferably 0.01 to 3.0, still more preferably 0.2 to 2.8, and most preferably 0.3 to 2.6.

These preferable ranges of the addition ratio slightly differ depending on the type of the aliphatic amide (B) and the organoaluminum compound (C) in terms of the effect. When (B) is represented by $(C_m H_{2m+1} CO)N(CH_2 CH_2 OH)_2$, a total of the number of CO in the carbonyl group and that of OH in the alcohol group is 3. Thus, in this case, from the standpoint of the effect, the molar ratio of the organoaluminum compound (C) is preferably up to a number that matches the total of the number of the carbonyl group and that of the alcohol group in the aliphatic amide.

The weight ratio (C)/(B) is preferably 0 to 3. At (C)/(B)= 0.1 to 2.5, the effect is intensified and preferable. More preferably, the weight ratio (C)/(B) is 0.2 to 2.

According to the method for producing an olefin polymer according to the present invention, the (co)polymerization can be conducted in any of a suspension, a solution, or a gas phase. In the present invention, polymerization of olefins is preferably conducted through slurry polymerization or gas-phase polymerization.

Examples of the inert hydrocarbon medium used in the slurry polymerization include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene and xylene; halogenated hydrocarbons such as ethylene chloride, chlorobenzene, and dichloromethane; and mixtures thereof. Among these inert hydrocarbon solvents, aliphatic hydrocarbons and alicyclic hydrocarbons are preferred.

The temperature of olefin polymerization is usually in the range of −50° C. to 150° C. and preferably 0° C. to 100° C. for slurry polymerization and usually in the range of 0° C. to 120° C. and preferably 20° C. to 100° C. for gas-phase polymerization. The polymerization pressure is usually atmospheric to 10 MPaG and preferably atmospheric to 5 MPaG. The polymerization may be conducted through a batch operation, a semi-continuous operation, or a continuous operation.

The polymerization can be conducted in two stages or more with different reaction conditions. The molecular weight of the obtained olefin polymer can be adjusted by causing hydrogen to be present in the polymerization system or changing the polymerization temperature.

Examples of the olefin used in polymerization include ethylene and α-olefins having 3 to 20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. One of these olefins may be used alone or two or more of these olefins may be used in combination. In the olefin polymer production of the present invention, copolymerizable monomers other than the olefins mentioned above may also be contained. Examples of such copolymerizable monomer include cyclic olefins having 3 to 20 carbon atoms, e.g., cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene. Styrene, vinylcyclohexane, and diene may also be used.

Of these, an olefin monomer is preferably used, which contains 100 to 0 mol % of ethylene, 0 to 49 mol % of propylene, and 0 to 100 mol % of an olefin having 4 or more carbon atoms, preferably 100 to 0 mol % of ethylene, 0 to 20 mol % of propylene, and 0 to 100 mol % of an α-olefin having 4 or more carbon atoms, more preferably 100 to 20 mol % of ethylene, 0 to 20 mol % of propylene, and 0 to 80 mol % of an α-olefin having 4 or more carbon atoms, and most preferably 100 to 20 mol % of ethylene and 0 to 80 mol % of an α-olefin having 4 or more carbon atoms. In particular, in the present invention, an ethylene-based polymer containing ethylene as the main monomer is preferably produced. The ethylene-based polymer is preferably a (co)polymer containing 50 mol % or more of the ethylene component and, if needed, an α-olefin component having 4 to 10 carbon atoms.

The amount of the catalyst for olefin polymerization (A) preferably used is usually $10^{-8}$ to $10^{-3}$ mol and preferably $10^{-7}$ to $10^{-4}$ mol on a basis of the transition metal atoms in the transition metal compound (A-1) per liter of the polymerization volume. The amount of the organoaluminoxy compound (A-2) preferably used is 10 to 500 mol and preferably 20 to 200 mol on an aluminum atom basis per mole of the transition metal atoms in the transition metal compound (A-1).

The amount of the aliphatic amide (B) used is usually 0.1 to 500 mg, preferably 0.2 to 200 mg, and more preferably 0.5 to 100 mg per liter of the polymerization volume.

The amount of the organoaluminum compound (C) used is usually 0.1 to 500 mg, preferably 0.2 to 200 mg, and more preferably 0.5 to 100 mg.

EXAMPLES

The present invention will now be described in further details on the basis of the examples which do not limit the scope of the present invention.

Methods for measuring the physical properties and characteristics of the polymer obtained by olefin polymerization in the presence of a catalyst containing a transition metal compound of the present invention are described below.

[Melt Flow Rate (MFR)]

The melt flow rate is a figure determined at 190° C. under a load of 2.16 kg according to the standard test method of ASTM D-1238.

[Bulk Density]

The bulk density was measured according to JIS K-6721.

[Density]

A sheet (spacer shape: nine 45×45×0.5 mm pieces from a plate of 240×240×0.5 (thickness) mm) 0.5 mm in thickness was shaped with a hydraulic heat pressing machine produced by Shinto Metal Industries Corporation set to 190° C. at a pressure of 100 kg/cm$^2$ and was cooled by being compressed at a pressure of 100 kg/cm$^2$ with another hydraulic heat pressing machine produced by Shinto Metal Industries Corporation set to 20° C. to prepare a measurement sample. A SUS plate having a thickness of 5 mm was used as the hot plate.

The pressed sheet was heat-treated for 1 hour at 120° C., slowly and linearly cooled to room temperature in 1 hour, and subjected to measurement using a density-gradient tube.

The molecular weight of the aliphatic amide used in Examples and Comparative Examples below was measured by the following process. Evaluation of the condition of the polymerization vessel inner wall during the (co)polymerization was conducted according to the polymerization method (1) below and evaluation of the polymerization activity was conducted by the polymerization method (2) below.

(B) Molecular Weight of Aliphatic Amide

The molecular weight of the aliphatic amide was measured by GC-MS below.

System: QP-2010 Plus produced by Shimadzu Corporation

Column: IC-5MS (0.32φ×30 m, film thickness: 0.5 μm)

Column oven temperature: 70° C.

Vaporizing chamber temperature: 250° C.

Temperature elevation pattern: 70° C.→(10° C./min)→320° C.

Carrier gas: He (120 kPa)

Split ratio: 50

Since the sample as it is was not suitable for detection, the sample was trimethylsilylated (TMS) to measure the molecular weight. Chemistat 2500 (aliphatic diethanolamide produced by Sanyo Chemical Industries, Ltd.) which is an aliphatic amide (B) used in this experiment was measured. As a result, a TMS compound having two trimethylsilyl groups was detected as a main compound. The molecular weight of the compound with trimethylsilyl groups was 431. The actual structure was analyzed based on this result. The molecular weight of the main structure was 287. In the description below, calculation of the organoaluminum compound (C)/aliphatic amide (B) addition ratio (molar ratio) was conducted by assuming the molecular weight of the component (B) to be 287. The main component of Chemistat 2500 was found to be lauryldiethanolamine $(C_{11}H_{23}CO)N(CH_2CH_2OH)_2$ based on the results of this molecular weight measurement.

Polymerization method (1): Evaluation of condition of autoclave wall

In Examples and Comparative Examples below, the condition of the autoclave wall was rated through the following polymerization method (1).

All the solvents used in Examples and Comparative Examples were dehydrated solvents.

The scheme of the slurry polymerization method for evaluating the condition of the autoclave wall is shown in FIG. 1.

Heptane was introduced into a polymerization vessel at room temperature, the system was purged with ethylene, 1-hexene and a solid catalyst component for olefin polymerization ((A)-a) were introduced, and the temperature was elevated to 55° C. It takes approximately 10 minutes until the temperature reaches 55° C. after the addition of ((A)-a).

An aliphatic amide (B) and an organoaluminum compound (C) were introduced, and then the solid catalyst component for olefin polymerization ((A)-b) was added again. The system was pressurized with ethylene and the temperature was elevated to a predetermined level to conduct polymerization.

In a typical polymerization, alkylaluminum is used as a scavenger after addition of the solid catalyst component for olefin polymerization ((A)-a) in FIG. 1. However, since alkylaluminum acts as an antistatic agent, evaluation of the compound (B) (antistatic agent) cannot be conducted. Thus, in the examples, the solid catalyst component for olefin polymerization ((A)-a) is used as a scavenger instead of alkylaluminum.

Referring to FIG. 1, if the solid catalyst component for olefin polymerization ((A)-a) is not used, the polymer yield decreases significantly. Little polymer is obtained if the solid catalyst component for olefin polymerization ((A)-b) is not used in FIG. 1 since some of the active sites of the solid catalyst component for olefin polymerization ((A)-b) are deactivated by the impurities in the system. This is because aluminum (derived from aluminoxane) contained in the solid catalyst component for olefin polymerization ((A)-a) acts as a scavenger and deactivates the active sites of the olefin polymerization catalyst ((A)-a).

The condition of the autoclave wall after the (co)polymerization was evaluated according to the following standard.

A: No adhesion of polymer to the autoclave wall etc., was observed

B: Slight adhesion of polymer to the autoclave wall etc., was observed

C: Adhesion of polymer to the autoclave wall etc., was observed.

Polymerization method (2): Evaluation of polymerization activity

Evaluation of the polymerization activity in Examples and Comparative Examples below was conducted by the following polymerization method (2). All the solvents used in Examples and Comparative Examples were dehydrated solvents.

Figure 2:
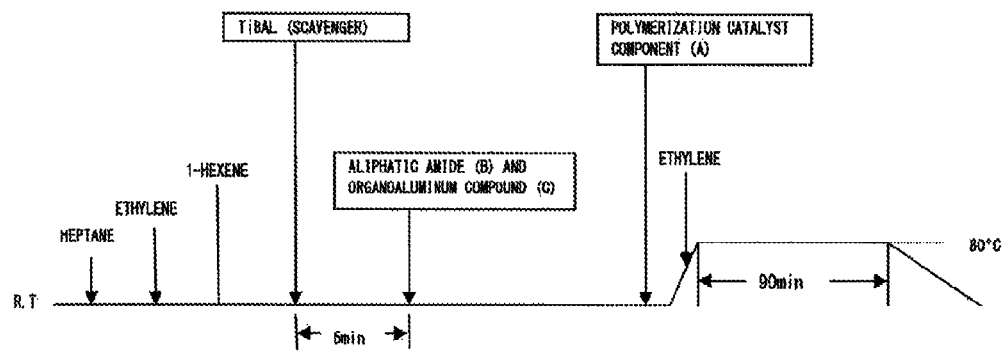
FIG. 2 shows a scheme of a process of a polymerization method (2) for evaluating polymerization activity in Examples and Comparative Examples.

The scheme of the slurry polymerization method for evaluating the polymerization activity in the autoclave is shown in FIG. 2.

Heptane was introduced into a polymerization vessel at room temperature, the system was purged with ethylene, and 1-hexene and a minimum amount (0.06 mmol) of triisobutylaluminum as a scavenger were used. Then an aliphatic amide (B) and an organoaluminum compound (C) were added, a solid catalyst component for olefin polymerization (A) was introduced, the system was pressurized with ethylene and the temperature was elevated to a predetermined level to conduct polymerization.

In the evaluation of the condition of the autoclave wall described above, an olefin polymerization catalyst was used as a scavenger. However, when the olefin polymerization catalyst is used as the scavenger and remains partly unconsumed in the system, such a catalyst also exhibits activity and thus evaluation of the activity cannot be accurately conducted. Accordingly, in the evaluation of the activity, a minimum amount of triisobutylaluminum not contributing to the activity was used as a scavenger to enable evaluation of the activity.

If triisobutylaluminum is not used in FIG. 2, the polymer yield decreases significantly. This is because some of the active sites of the solid catalyst component for olefin polymerization (A) are deactivated by the impurities in the system. If the solid catalyst component for olefin polymerization ((A)-a) is used as a scavenger and the solid catalyst component for olefin polymerization ((A)-2) is used as in the evaluation of the condition of the autoclave wall, the reproducibility of the evaluation regarding activity is not achieved. This is because, after aluminum (derived from aluminoxane) contained in the solid catalyst component for olefin polymerization ((A)-a) has acted as a scavenger, aluminum in the unconsumed solid catalyst component for olefin polymerization ((A)-a) remains and thus the solid catalyst component for olefin polymerization ((A)-a) itself exhibits polymerization capacity, resulting in failure to achieve reproducibility regarding activity.

Preparation Example 1

Preparation of Solid Catalyst Component (i)

Synthesis was conducted by the method disclosed in Japanese Unexamined Patent Application Publication No. 2000-327707. In particular, 10 kg of silica dried at 250° C. for 10 hours was suspended in 154 L of toluene, and the suspension was cooled to 0° C. Then, to this suspension, 50.5 L of a toluene solution of methylaminoxane (Al=1.52 mol/L) was added dropwise in 1 hour. During this process, the temperature of the system was maintained in the range of 0° C. to 5° C. Reaction was subsequently conducted for 30 minutes at 0° C., then the temperature was elevated to 95° C. in 1.5 hours, and reaction was conducted for 4 hours at that temperature. The temperature was then decreased to 60° C., and the supernatant was removed by decantation. The solid component obtained as such was washed twice with toluene and re-suspended in 100 L of toluene to give a total of 160 L of the suspension.

To the suspension obtained as such, 22.0 L of a toluene solution of bis(1,3-n-butylmethylcyclopentadienyl)zirconium dichloride (Zr=25.7 mmol/L) was added dropwise at 80° C. in 30 minutes, and the reaction was conducted at 80° C. for 2 hours. The supernatant was removed, and the residue was washed twice with hexane. As a result, a solid catalyst component (i) was obtained.

Preparation Example 2

Preparation of Prepolymerized Solid Catalyst Component (ii)

Synthesis was conducted by the method described in Japanese Unexamined Patent Application Publication No. 2000-327707. Into a 350 L reactor thoroughly purged with nitrogen, 7.0 kg of the solid catalyst component prepared as above and hexane were charged so that the total volume was 285 L. After the system was cooled to 10° C., ethylene was blown into hexane for 5 minutes at a flow rate of 8 Nm$^3$/h. During this process, the temperature of the system was maintained at 10° C. to 15° C. Then supply of ethylene was stopped and 2.4 mol of triisobutylaluminum and 1.2 kg of 1-hexene were charged. After the system was sealed, supply of ethylene was re-started at a flow rate of 8 Nm$^3$/h. After 15 minutes, the flow rate of ethylene was decreased to 2 Nm$^3$/h and the pressure in the system was adjusted to 0.8 kg/cm$^2$-G. During this process, the temperature in the system increased to 35° C. Ethylene was then supplied at a flow rate of 4 Nm$^3$/h for 3.5 hours while adjusting the temperature in the system in the range of 32° C. to 35° C. During this process, the pressure in the system was maintained to 0.7 to 0.8 kg/cm$^2$-G. Then the system was purged with nitrogen, the supernatant was removed, and the residue was washed twice with hexane. As a result, a prepolymerized solid catalyst component (ii) was obtained. In Examples and Comparative Examples below, this was used as the solid catalyst component for olefin polymerization (A) (Note: (A)-a and (A)-b were also the same).

Preparation Example 3

Preparation of Antistatic Agent Composition 1

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 1.41 ml of a toluene solution (4.25 mg/ml) of diethylaluminum ethoxide acting as the component (C) was added thereto. Thereto, 10.27 ml of toluene was added to prepare an antistatic agent composition 1 in the form of a solution. This solution contained 36 mg of Chemistat 2500 and 6 mg of diethylaluminum ethoxide.

Preparation Example 4

Preparation of Antistatic Agent Composition 2

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 5.64 ml of a toluene solution (4.25 mg/ml) of diethylaluminum ethoxide acting as the component (C) was added thereto. Thereto, 14.50 ml of toluene was added to prepare an antistatic agent composition 2 in the form of a solution. This solution contained 36 mg of Chemistat 2500 and 24 mg of diethylaluminum ethoxide.

Preparation Example 5

Preparation of Antistatic Agent Composition 3

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 2.82 ml of a toluene solution (4.25 mg/ml) of diethylaluminum ethoxide acting as the component (C) was added thereto. Thereto, 11.68 ml of toluene was added to prepare an antistatic agent composition 3 in the form of a solution. This solution contained 36 mg of Chemistat 2500 and 12 mg of diethylaluminum ethoxide.

Preparation Example 6

Preparation of Antistatic Agent Composition 4

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 8.46 ml of a toluene solution (4.25 mg/ml) of diethylaluminum ethoxide acting as the component (C) was added thereto. Thereto, 17.32 ml of toluene was added to prepare an antistatic agent composition 4 in the form of a solution. This solution contained 36 mg of Chemistat 2500 and 36 mg of diethylaluminum ethoxide.

Preparation Example 7

Preparation of Antistatic Agent Composition 5

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 9.87 ml of a toluene solution (4.25 mg/ml) of diethylaluminum ethoxide acting as the component (C) was added thereto. Thereto, 18.73 ml of toluene was added to prepare an antistatic agent composition 5 in the form of a solution. This solution contained 36 mg of Chemistat 2500 and 42 mg of diethylaluminum ethoxide.

Preparation Example 8

Preparation of Antistatic Agent Composition 6

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 11.28 ml of a toluene solution (4.25 mg/ml) of diethylaluminum ethoxide acting as the component (C) was added thereto. Thereto, 20.14 ml of toluene was added to prepare an antistatic agent composition 8 in the form of a solution. This solution contained 36 mg of Chemistat 2500 and 48 mg of diethylaluminum ethoxide.

Preparation Example 9

Preparation of Antistatic Agent Composition 7

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 16.93 ml of a toluene solution (4.25 mg/ml) of diethylaluminum ethoxide acting as the component (C) was added thereto. Thereto, 25.79 ml of toluene was added to prepare an antistatic agent composition 7 in the form of a solution. This solution contained 36 mg of Chemistat 2500 and 72 mg of diethylaluminum ethoxide.

Preparation Example 10

Preparation of Antistatic Agent Composition 8

Into a 100 ml Erlenmeyer flask thoroughly purged with nitrogen, 11.82 ml of a toluene solution (4.06 mg/ml) of a higher aliphatic amide (trade name: Chemistat 2500 produced by Sanyo Chemicals Industries, Ltd.) acting as the component (B) was charged, and 5.64 ml of a toluene solution (4.25 mg/ml) of diethylaluminum ethoxide acting as the component (C) was added thereto. Thereto, 17.46 ml of toluene was added to prepare an antistatic agent composition 8 in the form of a solution. This solution contained 48 mg of Chemistat 2500 and 24 mg of diethylaluminum ethoxide.

Preparation Example 11

Preparation of Antistatic Agent Composition 9

Into a 100 ml Erlenmeyer flask thoroughly purged with nitrogen, 3.84 ml of a toluene solution (4.06 mg/ml) of a higher aliphatic amide (trade name: Chemistat 2500 produced by Sanyo Chemicals Industries, Ltd.) acting as the component (B) was charged, and 2.82 ml of a toluene solution (4.25 mg/ml) of diethylaluminum ethoxide acting as the component (C) was added thereto. Thereto, 6.66 ml of toluene was added to prepare an antistatic agent composition 9 in the form of a solution. This solution contained 16 mg of Chemistat 2500 and 12 mg of diethylaluminum ethoxide.

Preparation Example 12

Preparation of Antistatic Agent Composition 10

Into a 100 ml Erlenmeyer flask thoroughly purged with nitrogen, 8.86 ml of a toluene solution (4.06 mg/ml) of a higher aliphatic amide (trade name: Chemistat 2500 produced by Sanyo Chemicals Industries, Ltd.) acting as the component (B) was charged, and 11.28 ml of a toluene solution (4.25 mg/ml) of triisobutylaluminum acting as the component (C) was added thereto. Thereto, 20.14 ml of toluene was added to prepare an antistatic agent composition 10 in the form of a solution. This solution contained 36 mg of Chemistat 2500 and 48 mg of triisobutylaluminum.

Examples 1-1

Case of Adding a Mixed Solution of Components (B) and (C) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, then 40 ml of 1-hexene and 0.58 g of the prepolymerized solid catalyst component (ii) ((A)-a) prepared in Preparation Example 2 were charged, and the temperature was elevated to 55° C. It takes approximately 10 minutes until the temperature reaches 55° C. after the addition of ((A)-a). Then 7.25 ml of the antistatic agent composition 2 prepared in Preparation Example 4 and 0.61 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers on the autoclave wall or impeller was found.

It should be noted that in this autoclave system, 9.00 mg of Chemistat 2500 and 6.00 mg of diethylaluminum ethoxide were present. The molar ratio of diethylaluminum ethoxide to Chemistat 2500 was diethylaluminum ethoxide/Chemistat 2500=1.47.

Example 1-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 4.23 ml of the antistatic agent composition 2 prepared in Preparation Example 4 and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 152.5 g of the polymer was obtained.

It should be noted that in this autoclave system, 5.25 mg of Chemistat 2500 and 3.50 mg of diethylaluminum ethoxide were present. The molar ratio of diethylaluminum ethoxide to Chemistat 2500 was diethylaluminum ethoxide/Chemistat 2500=1.47.

Comparative Example 1

Case of Not Adding Components (B) and (C) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.64 g of the prepolymerized solid catalyst component (ii) ((A)-a) prepared in Preparation Example 2 were charged, and the temperature was elevated to 55° C. Then 0.61 g of the prepolymerized solid catalyst component (ii) ((A)-b) prepared in Preparation Example 2 was added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. Adhesion of polymers to the autoclave wall or impeller was found.

Comparative Example 2-1

Case of Adding Only Component (B) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.62 g of the prepolymerized solid catalyst component (ii) ((A)-a) prepared in Preparation Example 2 were charged, and the temperature was elevated to 55° C. Then 2.22 ml of a toluene solution (4.06 mg/ml) of a higher aliphatic amide (trade name: Chemistat 2500 produced by Sanyo Chemicals Industries, Ltd.) acting as the component (B) and 0.68 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 was present.

Comparative Example 2-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1.30 ml of a toluene solution (4.06 mg/ml) of a higher aliphatic amide (trade name: Chemistat 2500, produced by Sanyo Chemicals Industries, Ltd.) acting as the component (B) and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm$^2$-G, polymerization was conducted for minutes. After termination of the polymerization, the system was depressurized and the polymer was filtered, washed, and dried under vacuum at 80° C. for 12 hours. As a result, 129.6 g of the polymer was obtained.

It should be noted that in this autoclave system, 5.25 mg of Chemistat 2500 was present.

Example 2-1

Case of Adding a Mixed Solution of Components (B) and (C) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.65 g of the prepolymerized solid catalyst component (ii) ((A)-a) prepared in Preparation Example 2 were charged, and the temperature was elevated to 55° C. Then 5.84 ml of the antistatic agent composition 3 prepared in Preparation Example 5 and 0.68 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 3.00 mg of diethylaluminum ethoxide were present. The molar ratio of diethylaluminum ethoxide to Chemistat 2500 was diethylaluminum ethoxide/Chemistat 2500=0.73.

Example 2-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.41 ml of the antistatic agent composition 3 prepared in Preparation Example 5 and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 146.5 g of the polymer was obtained.

It should be noted that in this autoclave system, 5.25 mg of Chemistat 2500 and 1.75 mg of diethylaluminum ethoxide were present. The molar ratio of diethylaluminum ethoxide to Chemistat 2500 was diethylaluminum ethoxide/Chemistat 2500=0.73.

Example 3-1

Case of Adding a Mixed Solution of Components (B) and (C) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.59 g of the prepolymerized solid catalyst component (ii) ((A)-a) prepared in Preparation Example 2 were charged, and the temperature was elevated to 55° C. Then 8.66 ml of the antistatic agent composition 4 prepared in Preparation Example 6 and 0.58 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 9.00 mg of diethylaluminum ethoxide were present. The molar ratio of diethylaluminum ethoxide to Chemistat 2500 was diethylaluminum ethoxide/Chemistat 2500=2.20.

Example 3-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 5.05 ml of the antistatic agent composition 4 prepared in Preparation Example 6 and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 142.5 g of the polymer was obtained.

It should be noted that in this autoclave system, 5.25 mg of Chemistat 2500 and 5.25 mg of diethylaluminum ethoxide were present. The molar ratio of diethylaluminum ethoxide to Chemistat 2500 was diethylaluminum ethoxide/Chemistat 2500=2.20.

Example 4-1

Case of Adding a Mixed Solution of Components (B) and (C) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.6 g of the prepolymerized solid catalyst component (ii) ((A)-a) prepared in Preparation Example 2 were charged, and the temperature was elevated to 55° C. Then 5.14 ml of the antistatic agent composition 1 prepared in Preparation Example 3 and 0.6 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 1.50 mg of diethylaluminum ethoxide were present. The molar ratio of diethylaluminum ethoxide to Chemistat 2500 was diethylaluminum ethoxide/Chemistat 2500=0.37.

Example 4-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.00 ml of the antistatic agent composition 1 prepared in Preparation Example 3 and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 141.2 g of the polymer was obtained.

It should be noted that in this autoclave system, 5.25 mg of Chemistat 2500 and 0.88 mg of diethylaluminum ethoxide were present. The molar ratio of diethylaluminum ethoxide to Chemistat 2500 was diethylaluminum ethoxide/Chemistat 2500=0.37.

Example 5-1

Case of Adding a Mixed Solution of Components (B) and (C) During Polymerization

<Polymerization Method (1): Evaluation of Condition of Autoclave Wall>

The same operation as Example 4-1 was conducted except that 9.38 ml of the antistatic agent composition 5 prepared in Preparation Example 7 was added instead of 5.14 ml of the antistatic agent composition 1 in Example 4-1. After the termination of the polymerization, the condition of the autoclave after the polymerization was checked. No adhesion of polymers to the autoclave wall or impeller was found.

It should be noted that in this autoclave system, 9.00 mg of Chemistat 2500 and 10.50 mg of diethylaluminum ethoxide were present. The molar ratio of diethylaluminum ethoxide to Chemistat 2500 was diethylaluminum ethoxide/Chemistat 2500=2.57.

Example 5-2

Polymerization Method (2): Evaluation of Polymerization Activity

The same operation as Example 4-2 was conducted except that 5.47 ml of the antistatic agent composition 5 prepared in Preparation Example 7 was added instead of 3.00 ml of the antistatic agent composition 1 in Example 4-2. After termination of the polymerization, the system was depressurized and the polymer was filtered, washed, and dried under vacuum at 80° C. for 12 hours. As a result, 122.4 g of the polymer was obtained.

It should be noted that in this autoclave system, 5.25 mg of Chemistat 2500 and 6.13 mg of diethylaluminum ethoxide were present. The molar ratio of diethylaluminum ethoxide to Chemistat 2500 was diethylaluminum ethoxide/Chemistat 2500=2.57.

Example 6-1

Case of Adding a Mixed Solution of Components (B) and (C) During Polymerization

<Polymerization Method (1): Evaluation of Condition of Autoclave Wall>

The same operation as Example 4-1 was conducted except that 10.08 ml of the antistatic agent composition 6 prepared in Preparation Example 8 was added instead of 5.14 ml of the antistatic agent composition 1 in Example 4-1. After the termination of the polymerization, the condition of the autoclave after the polymerization was checked. No adhesion of polymers to the autoclave wall or impeller was found.

It should be noted that in this autoclave system, 9.00 mg of Chemistat 2500 and 12.00 mg of diethylaluminum ethoxide were present. The molar ratio of diethylaluminum ethoxide to Chemistat 2500 was diethylaluminum ethoxide/Chemistat 2500=2.94.

Example 6-2

Polymerization Method (2): Evaluation of Polymerization Activity

The same operation as Example 4-2 was conducted except that 5.88 ml of the antistatic agent composition 6 prepared in Preparation Example 8 was added instead of 3.00 ml of the antistatic agent composition 1 in Example 4-2. After termination of the polymerization, the system was depressurized and the polymer was filtered, washed, and dried under vacuum at 80° C. for 12 hours. As a result, 110.6 g of the polymer was obtained.

It should be noted that in this autoclave system, 5.25 mg of Chemistat 2500 and 7.00 mg of diethylaluminum ethoxide were present. The molar ratio of diethylaluminum ethoxide to Chemistat 2500 was diethylaluminum ethoxide/Chemistat 2500=2.94.

Example 7-1

Case of Adding a Mixed Solution of Components (B) and (C) During Polymerization

<Polymerization Method (1): Evaluation of Condition of Autoclave Wall>

The same operation as Example 4-1 was conducted except that 12.89 ml of the antistatic agent composition 7 prepared in Preparation Example 9 was added instead of 5.14 ml of the antistatic agent composition 1 in Example 4-1. After the termination of the polymerization, the condition of the autoclave after the polymerization was checked. No adhesion of polymers to the autoclave wall or impeller was found.

It should be noted that in this autoclave system, 9.00 mg of Chemistat 2500 and 18.00 mg of diethylaluminum ethoxide were present. The molar ratio of diethylaluminum ethoxide to Chemistat 2500 was diethylaluminum ethoxide/Chemistat 2500=4.41.

Example 7-2

Polymerization Method (2): Evaluation of Polymerization Activity

The same operation as Example 4-2 was conducted except that 7.52 ml of the antistatic agent composition 7 prepared in Preparation Example 9 was added instead of 3.00 ml of the antistatic agent composition 1 in Example 4-2. After termination of the polymerization, the system was depressurized and the polymer was filtered, washed, and dried under vacuum at 80° C. for 12 hours. As a result, 108.0 g of the polymer was obtained.

It should be noted that in this autoclave system, 5.25 mg of Chemistat 2500 and 10.50 mg of diethylaluminum ethoxide were present. The molar ratio of diethylaluminum ethoxide to Chemistat 2500 was diethylaluminum ethoxide/Chemistat 2500=4.41.

Example 8-1

Case of Adding a Mixed Solution of Components (B) and (C) During Polymerization

<Polymerization Method (1): Evaluation of Condition of Autoclave Wall>

The same operation as Example 4-1 was conducted except that 8.73 ml of the antistatic agent composition 8 prepared in Preparation Example 10 was added instead of 5.14 ml of the antistatic agent composition 1 in Example 4-1. After the termination of the polymerization, the condition of the autoclave after the polymerization was checked. No adhesion of polymers to the autoclave wall or impeller was found.

It should be noted that in this autoclave system, 12.00 mg of Chemistat 2500 and 6.00 mg of diethylaluminum ethoxide were present. The molar ratio of diethylaluminum ethoxide to Chemistat 2500 was diethylaluminum ethoxide/Chemistat 2500=1.10.

Example 8-2

Polymerization Method (2): Evaluation of Polymerization Activity>

The same operation as Example 4-2 was conducted except that 5.09 ml of the antistatic agent composition 8 prepared in Preparation Example 10 was added instead of 3.00 ml of the antistatic agent composition 1 in Example 4-2. After termination of the polymerization, the system was depressurized and the polymer was filtered, washed, and dried under vacuum at 80° C. for 12 hours. As a result, 138.0 g of the polymer was obtained.

It should be noted that in this autoclave system, 7.00 mg of Chemistat 2500 and 3.50 mg of diethylaluminum ethoxide were present. The molar ratio of diethylaluminum ethoxide to Chemistat 2500 was diethylaluminum ethoxide/Chemistat 2500=1.10.

Comparative Example 3-1

Case of Adding Only Component (B) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.68 g of the prepolymerized solid catalyst component (ii) ((A)-a) prepared in Preparation Example 2 were charged, and the temperature was elevated to 55° C. Then 5.91 ml of a toluene solution (4.06 mg/ml) of a higher aliphatic amide (trade name: Chemistat 2500 produced by Sanyo Chemicals Industries, Ltd.) acting as the component (B) and 0.53 g of the prepolymerized solid catalyst component (ii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 24.00 mg of Chemistat 2500 was present.

Comparative Example 3-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.04 ml of a toluene solution (4.06 mg/ml) of a higher aliphatic amide (trade name: Chemistat 2500, produced by Sanyo Chemicals Industries, Ltd.) acting as the component (B) and 0.40 g of the prepolymerized solid catalyst component (ii) (A) prepared in Preparation Example 2 were added thereto and the temperature in the system was elevated to 73° C. Ethylene was then introduced to start polymerization. While continuously supplying ethylene so that the pressure was maintained at 8.0 kg/cm²-G, polymerization was conducted for minutes. After termination of the polymerization, the system was depressurized and the polymer was filtered, washed, and dried under vacuum at 80° C. for 12 hours. As a result, 90.4 g of the polymer was obtained.

It should be noted that in this autoclave system, 14.00 mg of Chemistat 2500 was present.

Example 9-1

Case of Adding a Mixed Solution of Components (B) and (C) During Polymerization

<Polymerization Method (1): Evaluation of Condition of Autoclave Wall>

The same operation as Example 4-1 was conducted except that 10.08 ml of the antistatic agent composition 10 prepared in Preparation Example 12 was added instead of 5.14 ml of the antistatic agent composition 1 in Example 4-1. After the termination of the polymerization, the condition of the autoclave after the polymerization was checked. No adhesion of polymers to the autoclave wall or impeller was found.

It should be noted that in this autoclave system, 9.00 mg of Chemistat 2500 and 12.00 mg of triisobutylaluminum were present. The molar ratio of triisobutylaluminum to Chemistat 2500 was triisobutylaluminum/Chemistat 2500=1.93.

Example 9-2

Polymerization Method (2): Evaluation of Polymerization Activity

The same operation as Example 4-2 was conducted except that 5.88 ml of the antistatic agent composition 10 prepared in Preparation Example 12 was added instead of 3.00 ml of the antistatic agent composition 1 in Example 4-2. After termination of the polymerization, the system was depressurized and the polymer was filtered, washed, and dried under vacuum at 80° C. for 12 hours. As a result, 178.2 g of the polymer was obtained.

It should be noted that in this autoclave system, 5.25 mg of Chemistat 2500 and 7.00 mg of triisobutylaluminum were present. The molar ratio of triisobutylaluminum to Chemistat 2500 was triisobutylaluminum/Chemistat 2500=1.93.

Example 10-1

Case of Adding a Mixed Solution of Components (B) and (C) During Polymerization

<Polymerization Method (1): Evaluation of Condition of Autoclave Wall>

In Examples 10-1, 10-2, 11-1, 11-2, 12-1, and 12-2 and Comparative Examples 4-1 and 4-2, a prepolymerized solid catalyst component (iii) was used as the solid catalyst component for olefin polymerization (A). The prepolymerized solid catalyst component (iii) was prepared by drying the prepolymerized solid catalyst component (ii) prepared in Preparation Example 2 at room temperature and reduced pressure into a powdery catalyst and storing the powdery catalyst in a nitrogen atmosphere.

Into a 2000 ml stainless steel autoclave thoroughly purged with nitrogen, 1000 ml of n-heptane was charged, the system was purged with ethylene, 40 ml of 1-hexene and 0.66 g of the prepolymerized solid catalyst component (iii) ((A)-a) were charged, and the temperature was elevated to 55° C. Then 5.84 ml of the antistatic agent composition 3 prepared in Preparation Example 5 and 0.68 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 3.00 mg of diethylaluminum ethoxide were present. The molar ratio of diethylaluminum ethoxide to Chemistat 2500 was diethylaluminum ethoxide/Chemistat 2500=0.73.

Example 10-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.41 ml of the antistatic agent composition 3 prepared in Preparation Example 5 and 0.43 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 147.1 g of the polymer was obtained.

The physical properties of the obtained polymer were determined. MFR was 0.17 g/10 min, the density was 927 kg/m³, and the bulk density was 389 kg/m³.

It should be noted that in this autoclave system, 5.25 mg of Chemistat 2500 and 1.75 mg of diethylaluminum ethoxide were present. The molar ratio of diethylaluminum ethoxide to Chemistat 2500 was diethylaluminum ethoxide/Chemistat 2500=0.73.

Comparative Example 4-1

Case of Adding Only Component (B) During Polymerization

<Polymerization Method (1): Evaluation of Condition of Autoclave Wall>

Into a 2000 ml stainless steel autoclave thoroughly purged with nitrogen, 1000 ml of n-heptane was charged, the system was purged with ethylene, 40 ml of 1-hexene and 0.60 g of the prepolymerized solid catalyst component (iii) ((A)-a) were charged, and the temperature was elevated to 55° C. Then 2.22 ml of a toluene solution (4.06 mg/ml) of a higher aliphatic amide (trade name: Chemistat 2500 produced by Sanyo Chemicals Industries, Ltd.) acting as the component (B) and 0.60 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 was present.

Comparative Example 4-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1.30 ml of a toluene solution (4.06 mg/ml) of a higher aliphatic amide (trade name: Chemistat 2500, produced by Sanyo Chemicals Industries, Ltd.) acting as the component (B) and 0.40 g of the prepolymerized solid catalyst component (iii) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 115.8 g of the polymer was obtained.

The physical properties of the obtained polymer were determined. MFR was 0.17 g/10 min, the density was 928 kg/m³, and the bulk density was 412 kg/m³.

It should be noted that in this autoclave system, 5.25 mg of Chemistat 2500 was present.

Example 11-1

Case of Sequentially Adding a Mixed Solution of Components (B) and (C), and the Component (B) During Polymerization <Polymerization Method (1): Evaluation of Condition of Autoclave Wall>

The same operation as Comparative Example 4-1 was conducted except that 3.34 ml of the antistatic agent composition 9 prepared in Preparation Example 11 and 1.26 ml of a toluene solution (4.06 mg/ml) of a higher aliphatic amide (trade name: Chemistat 2500 produced by Sanyo Chemicals Industries, Ltd.) acting as the component (B) were sequentially added instead of adding 2.22 ml of the toluene solution (4.06 mg/ml) of the higher aliphatic amide (trade name: Chemistat 2500 produced by Sanyo Chemicals Industries, Ltd.) acting as the component (B) in Comparative Example 4-1. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 3.00 mg of diethylaluminum ethoxide were present. The molar ratio of diethylaluminum ethoxide to Chemistat 2500 was diethylaluminum ethoxide/Chemistat 2500=0.73.

Example 11-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1.95 ml of the antistatic agent composition 9 prepared in Preparation Example 11 and 0.37 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 119.2 g of the polymer was obtained.

The physical properties of the obtained polymer were determined. MFR was 0.20 g/10 min, the density was 928 kg/m³, and the bulk density was 402 kg/m³.

It should be noted that in this autoclave system, 5.25 mg of Chemistat 2500 and 1.75 mg of diethylaluminum ethoxide were present. The molar ratio of diethylaluminum ethoxide to Chemistat 2500 was diethylaluminum ethoxide/Chemistat 2500=0.73.

Example 12-1

Case of Sequentially Adding Components (B) and (C)

<Polymerization Method (1): Evaluation of Condition of Autoclave Wall>

The same operation as Comparative Example 4-1 was conducted except that 2.22 ml of a toluene solution (4.06 mg/ml) of a higher aliphatic amide (trade name: Chemistat 2500 produced by Sanyo Chemicals Industries, Ltd.) acting as the component (B) and 0.71 ml of a toluene solution (4.25 mg/ml) of diethylaluminum ethoxide acting as the component (C) were sequentially added instead of 2.22 ml of the toluene solution (4.06 mg/ml) of the higher aliphatic amide (trade name: Chemistat 2500 produced by Sanyo Chemicals Industries, Ltd.) acting as the component (B) in Comparative Example 4-1. After the termination of the polymerization, the system was depressurized, the polymer was removed, and the condition of the autoclave after the polymerization was observed. No adhesion of polymers to the autoclave wall or impeller was found.

It should be noted that in this autoclave system, 9.00 mg of Chemistat 2500 and 3.00 mg of diethylaluminum ethoxide were present. The molar ratio of diethylaluminum ethoxide to Chemistat 2500 was diethylaluminum ethoxide/Chemistat 2500=0.73.

Example 12-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1.30 ml of a toluene solution (4.06 mg/ml) of a higher aliphatic amide (trade name: Chemistat 2500, produced by Sanyo Chemicals Industries, Ltd.) acting as the component (B) and 0.41 ml of a toluene solution (4.25 mg/ml) of diethylaluminum ethoxide acting as the component (C) were sequentially added, 0.36 g of the prepolymerized solid catalyst component (iii) (A) was added thereto, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 104.4 g of the polymer was obtained.

The physical properties of the obtained polymer were determined. MFR was 0.18 g/10 min, the density was 929 kg/m$^3$, and the bulk density was 381 kg/m$^3$.

It should be noted that in this autoclave system, 9.00 mg of Chemistat 2500 and 3.00 mg of diethylaluminum ethoxide were present. The molar ratio of diethylaluminum ethoxide to Chemistat 2500 was diethylaluminum ethoxide/Chemistat 2500=0.73.

Example 13

Evaluation of Operability for Gas-Phase Polymerization

Figure 3:
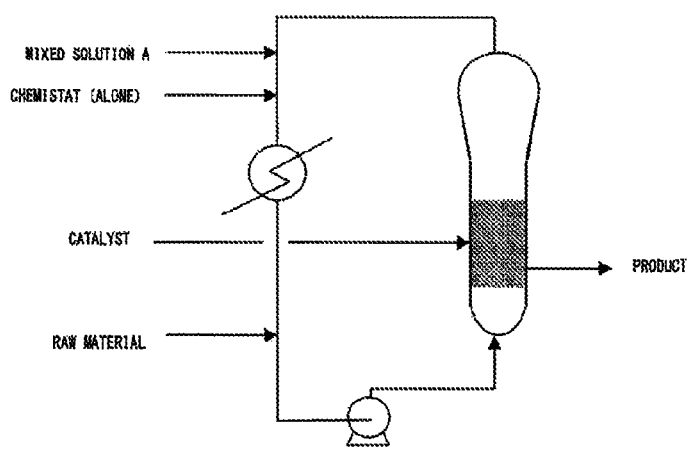
FIG. 3 shows a scheme of a polymerization process of Example 13 for evaluating the operability of gas-phase polymerization using a fluidized-bed gas-phase polymerization reactor.
Figure 4:
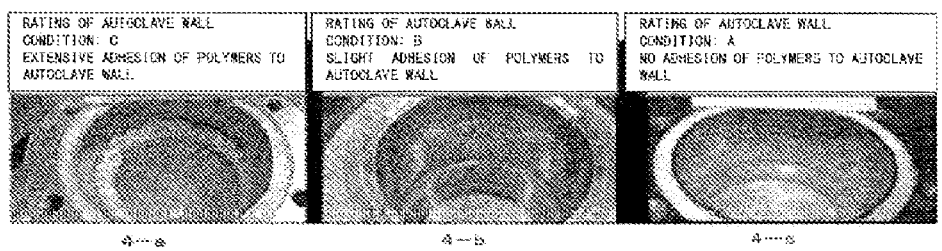
FIG. 4 include images that show the extent of polymer adherence to the autoclave inner wall at respective evaluation ratings.

Copolymerization of ethylene and 1-hexene was conducted in a fluidized bed-type gas-phase reactor shown in FIG. 3. The polymerization pressure was 1.5 MPaG, polymerization temperature was 80° C., and the ethylene content in the polymerization reactor was 65 mol %. The prepolymerized solid catalyst component (iii), used as the solid catalyst component for olefin polymerization, was supplied to the polymerization reactor so that the polymer production rate was 18 ton/hr. Hydrogen was used to adjust the molecular weight of the polymer and 1-hexene was used to adjust the density. A hydrocarbon-containing gas containing 28.2 mol % of nitrogen, 65 mol % of ethylene, 1.8 mol % of 1-hexene, 5 mol % of isopentane, and 300 ppm of hydrogen was circulated in a circulation gas line at a flow rate of 42 km$^3$/hr.

A mixed solution A was prepared as an antistatic agent composition by mixing a higher aliphatic amide (trade name: Chemistat 2500 produced by Sanyo Chemicals Industries, Ltd.) and diethylaluminum ethoxide at a weight ratio of 9:7. The mixed solution A was continuously supplied to the circulation gas line.

Further, a minimum amount of Chemistat 2500 needed for stable operation was continuously supplied alone to the circulation gas line. As a result, the reading of the wall thermometer was stabilized, adhesion or separation of polyethylene fines to or from the vessel wall was not observed, and safe operation was carried out.

Comparative Example 5

Evaluation of Operability for Gas-Phase Polymerization

Evaluation was conducted under the same conditions as in Example 13 except that the mixed solution A was not supplied to the circulation gas line. In other words, a minimum amount of Chemistat 2500 needed for stable operation was continuously supplied alone to the circulation gas line. As a result, the reading of the wall thermometer was stabilized, adhesion or separation of polyethylene fines to or from the vessel wall was not observed, and safe operation was carried out.

Comparative Example 6

Evaluation of Operability for Gas-Phase Polymerization

Evaluation was conducted under the same conditions as in Comparative Example 5 except that the supply concentration of Chemistat alone relative to the production rate was decreased by 5 ppm from that of Comparative Example 5. As a result, the reading of the wall thermometer which had been stable repeated a rapid increase and a rapid decrease. In other words, adhesion and separation of polyethylene fines with a high catalyst content on a vessel wall were repeated and the operation condition became insatiable. If this condition is left to continue, fines will adhere to the wall, resulting in insufficient heat removal, and polyethylene masses will be generated, thereby rendering continuation of the operation impossible.

Preparation Example 13

Preparation of Solid Catalyst Component (iv)

In 154 L of toluene, 10 kg of silica dried at 250° C. for 10 hours was suspended, and the suspension was cooled to 0° C. To this suspension, 50.5 L of a toluene solution of methylaminoxane (Al=1.52 mol/L) was added dropwise in 1 hour. During this process, the temperature of the system was maintained in the range of 0° C. to 5° C. Reaction was subsequently conducted for 30 minutes at 0° C., the temperature was elevated to 95° C. in 1.5 hours, and reaction was conducted for 4 hours at that temperature. The temperature was then decreased to 60° C., and the supernatant was removed by decantation. The solid component obtained as such was washed twice with toluene and re-suspended in 100 L of toluene to give a total of 160 L of the suspension.

From the resulting suspension, 3.30 g of slurry was taken as a solid component. To this slurry, 38.6 ml of a toluene solution of dimethylmethylene(cyclopentadienyl)(2,7-di-t-butylfluorenyl)zirconium dichloride (Zr=3 mmol/L) was added dropwise at room temperature in 30 minutes, followed by reaction at room temperature for 1 hour. The supernatant was then removed and the residue was washed twice with hexane. As a result, a solid catalyst component (iv) was obtained.

Preparation Example 14

Preparation of Prepolymerized Solid Catalyst Component (v)

Into a 300 ml reactor thoroughly purged with nitrogen, all of the solid catalyst component (iv) prepared in Preparation Example 13 above and hexane were charged so that the total volume was 50 ml. After the system was cooled to 10° C., 5.78 mmol of triisobutylaluminum was charged. After the system was sealed, supply of ethylene was started. With the increase in temperature in the system, prepolymerization was conducted with ethylene in an amount that can produce 3 g of polyethylene in 3.5 hours per gram of the solid component while adjusting the temperature in the system to 32° C. to 35° C. Then, the system was purged with nitrogen, the supernatant was removed, and the residue was washed twice with hexane. As a result, a prepolymerized solid catalyst component (v) was obtained.

Preparation Example 15

Preparation of Solid Catalyst Component (vi)

In 154 L of toluene, 10 kg of silica dried at 250° C. for 10 hours was suspended, and the suspension was cooled to 0° C. To this suspension, 50.5 L of a toluene solution of methylaminoxane (Al=1.52 mol/L) was added dropwise in 1 hour. During this process, the temperature of the system was maintained in the range of 0° C. to 5° C. Reaction was subsequently conducted for 30 minutes at 0° C., and the temperature was elevated to 95° C. in 1.5 hours, and reaction was conducted for 4 hours at that temperature. The temperature was then decreased to 60° C., and the supernatant was removed by decantation. The solid component obtained as such was washed twice with toluene and re-suspended in 100 L of toluene to give a total of 160 L of the suspension.

From the resulting suspension, 4.54 g of slurry was taken as a solid component. To this slurry, 60.0 ml of a toluene solution of ethylenebis(1-indenyl)zirconium dichloride (Zr=28.7 mmol/L) was added dropwise at room temperature in 30 minutes, followed by reaction at room temperature for 1 hour. The supernatant was then removed and the residue was washed twice with hexane. As a result, a solid catalyst component (vi) was obtained.

Preparation Example 16

Preparation of Prepolymerized Solid Catalyst Component (vii))

To the prepolymerized solid catalyst component (ii) prepared in Preparation Example 2, 0.01 g of Chemistat 2500 (higher aliphatic amide produced by Sanyo Chemicals Industries, Ltd.) was added per gram of the component (ii), followed by reaction for 4 hours at 35° C. The obtained solid catalyst component was filtered and dried at room temperature and a reduced pressure. As a result, a prepolymerized solid catalyst component (vii) was obtained.

Preparation Example 17

Preparation of Antistatic Agent Composition 11

Into a 100 ml Erlenmeyer flask thoroughly purged with nitrogen, 5.00 ml of a toluene solution (88.19 mg/ml) of Chemistat 2500 (higher aliphatic amide produced by Sanyo Chemicals Industries, Ltd.) acting as the component (B) was charged, and 1.69 ml of a toluene solution (130.17 mg/ml) of diethylaluminum ethoxide acting as the component (C) was added thereto. Thereto, 56.30 ml of toluene was added to prepare an antistatic agent composition 11 in the form of a solution. In 1 ml of this solution, 7.00 mg of Chemistat 2500 and 3.50 mg of triisobutylaluminum were contained.

Preparation Example 18

Preparation of Antistatic Agent Composition 12

Into a 100 ml Erlenmeyer flask thoroughly purged with nitrogen, 5.00 ml of a toluene solution (88.19 mg/ml) of Chemistat 2500 (higher aliphatic amide produced by Sanyo Chemicals Industries, Ltd.) acting as the component (B) was charged, and 2.26 ml of a toluene solution (130.17 mg/ml) of diethylaluminum ethoxide acting as the component (C) was added thereto. Thereto, 55.73 ml of toluene was added to prepare an antistatic agent composition 12 in the form of a solution. In 1 ml of this solution, 7.00 mg of Chemistat 2500 and 4.67 mg of triisobutylaluminum were contained.

Preparation Example 19

Preparation of Antistatic Agent Composition 13

Into a 100 ml Erlenmeyer flask thoroughly purged with nitrogen, 6.20 ml of a toluene solution (88.19 mg/ml) of Chemistat 2500 (higher aliphatic amide produced by Sanyo Chemicals Industries, Ltd.) acting as the component (B) was charged, and 1.92 ml of a toluene solution (142.22 mg/ml) of diisobutylaluminum hydride acting as the component (C) was added thereto. Thereto, 69.99 ml of toluene was added to prepare an antistatic agent composition 13 in the form of a solution. In 1 ml of this solution, 7.00 mg of Chemistat 2500 and 3.50 mg of diisobutylaluminum hydride were contained.

Preparation Example 20

Preparation of Antistatic Agent Composition 14

Into a 100 ml Erlenmeyer flask thoroughly purged with nitrogen, 4.00 ml of a toluene solution (88.19 mg/ml) of Chemistat 2500 (higher aliphatic amide produced by Sanyo Chemicals Industries, Ltd.) acting as the component (B) was charged, and 3.10 ml of a toluene solution (142.22 mg/ml) of diisobutylaluminum hydride acting as the component (C) was added thereto. Thereto, 43.29 ml of toluene was added to prepare an antistatic agent composition 14 in the form of a solution. In 1 ml of this solution, 7.00 mg of Chemistat 2500 and 8.75 mg of diisobutylaluminum hydride were contained.

Preparation Example 21

Preparation of Antistatic Agent Composition 15

Into a 100 ml Erlenmeyer flask thoroughly purged with nitrogen, 5.50 ml of a toluene solution (88.19 mg/ml) of Chemistat 2500 (higher aliphatic amide produced by Sanyo Chemicals Industries, Ltd.) acting as the component (B) was charged, and 2.82 ml of a toluene solution (142.22 mg/ml) of diisobutylaluminum hydride acting as the component (C) was added thereto. Thereto, 60.98 ml of toluene was added to prepare an antistatic agent composition 15 in the form of a solution. In 1 ml of this solution, 7.00 mg of Chemistat 2500 and 5.78 mg of diisobutylaluminum hydride were contained.

Preparation Example 22

Preparation of Antistatic Agent Composition 16

Into a 100 ml Erlenmeyer flask thoroughly purged with nitrogen, 5.80 ml of a toluene solution (88.19 mg/ml) of Chemistat 2500 (higher aliphatic amide produced by Sanyo Chemicals Industries, Ltd.) acting as the component (B) was charged, and 2.24 ml of a toluene solution (114.17 mg/ml) of triethylaluminum acting as the component (C) was added thereto. Thereto, 65.03 ml of toluene was added to prepare an antistatic agent composition 16 in the form of a solution. In 1 ml of this solution, 7.00 mg of Chemistat 2500 and 3.50 mg of triethylaluminum were contained.

Preparation Example 23

Preparation of Antistatic Agent Composition 17

Into a 100 ml Erlenmeyer flask thoroughly purged with nitrogen, 5.50 ml of a toluene solution (88.19 mg/ml) of Chemistat 2500 (higher aliphatic amide produced by Sanyo Chemicals Industries, Ltd.) acting as the component (B) was charged, and 2.83 ml of a toluene solution (114.17 mg/ml) of triethylaluminum acting as the component (C) was added thereto. Thereto, 60.96 ml of toluene was added to prepare an antistatic agent composition 17 in the form of a solution. In 1 ml of this solution, 7.00 mg of Chemistat 2500 and 4.67 mg of triethylaluminum were contained.

Preparation Example 24

Preparation of Antistatic Agent Composition 18

Into a 100 ml Erlenmeyer flask thoroughly purged with nitrogen, 6.40 ml of a toluene solution (88.19 mg/ml) of Chemistat 2500 (higher aliphatic amide produced by Sanyo Chemicals Industries, Ltd.) acting as the component (B) was charged, and 1.00 ml of a toluene solution (282.49 mg/ml) of tri-normal-hexylaluminum acting as the component (C) was added thereto. Thereto, 73.23 ml of toluene was added to prepare an antistatic agent composition 18 in the form of a solution. In 1 ml of this solution, 7.00 mg of Chemistat 2500 and 3.5 mg of tri-normal-hexylaluminum were contained.

Preparation Example 25

Preparation of Antistatic Agent Composition 19

Into a 100 ml Erlenmeyer flask thoroughly purged with nitrogen, 24.20 ml of a toluene solution (14 mg/ml) of AMIET 105 (polyoxyethylene coconut alkyl amine produced by Kao Corporation) acting as the component (B) was charged, and 1.30 ml of a toluene solution (130.17 mg/ml) of diethylaluminum ethoxide acting as the component (C) was added thereto. Thereto, 22.90 ml of toluene was added to prepare an antistatic agent composition 19 in the form of a solution. In 1 ml of this solution, 7.00 mg of AMIET 105 and 3.50 mg of diethylaluminum ethoxide were contained.

Preparation Example 26

Preparation of Antistatic Agent Composition 20

Into a 100 ml Erlenmeyer flask thoroughly purged with nitrogen, 24.50 ml of a toluene solution (40 mg/ml) of EPAN 720 (polyoxyethylene polyoxypropylene block copolymer, produced by Dai-Ichi Kogyo Seiyaku Co., Ltd.) acting as the component (B) was charged, and 1.88 ml of a toluene solution (130.17 mg/ml) of diethylaluminum ethoxide acting as the component (C) was added thereto. Thereto, 43.62 ml of toluene was added to prepare an antistatic agent composition in the form of a solution. In 1 ml of this solution, 14.00 mg of EPAN 720 and 3.50 mg of diethylaluminum ethoxide were contained.

Preparation Example 27

Preparation of Antistatic Agent Composition 21

Into a 100 ml Erlenmeyer flask thoroughly purged with nitrogen, 3.90 ml of a toluene solution (40 mg/ml) of EMULGEN 108 (polyoxyethylene lauryl ether, produced by Kao Corporation) acting as the component (B) was charged, and 0.60 ml of a toluene solution (130.17 mg/ml) of diethylaluminum ethoxide acting as the component (C) was added thereto. Thereto, 17.79 ml of toluene was added to prepare an antistatic agent composition 21 in the form of a solution. In 1 ml of this solution, 7.00 mg of EMULGEN 108 and 3.50 mg of diethylaluminum ethoxide were contained.

Preparation Example 28

Preparation of Antistatic Agent Composition 22

Into a 100 ml Erlenmeyer flask thoroughly purged with nitrogen, 3.00 ml of a toluene solution (40 mg/ml) of Electro-stripper EA (lauryl diethanolamine produced by Kao Corporation) acting as the component (B) was charged, and 0.92 ml of a toluene solution (130.17 mg/ml) of diethylaluminum ethoxide acting as the component (C) was added thereto. Thereto, 13.22 ml of toluene was added to prepare an antistatic agent composition 22 in the form of a solution. In 1 ml of this solution, 7.00 mg of Electro-stripper EA and 7.00 mg of diethylaluminum ethoxide were contained.

Preparation Example 29

Preparation of Antistatic Agent Composition 23

Into a 100 ml Erlenmeyer flask thoroughly purged with nitrogen, 24.20 ml of a toluene solution (14 mg/ml) of Electro-stripper EA7 (polyoxyethylenelaurylamine caproyl ester produced by Kao Corporation) acting as the component (B) was charged, and 1.30 ml of a toluene solution (130.17 mg/ml) of diethylaluminum ethoxide acting as the component (C) was added thereto. Thereto, 22.90 ml of toluene was added to prepare an antistatic agent composition 23 in the form of a solution. In 1 ml of this solution, 7.00 mg of Electro-stripper EA7 and 3.50 mg of diethylaluminum ethoxide were contained.

Preparation Example 30

Preparation of Antistatic Agent Composition 24

Into a 100 ml Erlenmeyer flask thoroughly purged with nitrogen, 10.00 ml of a toluene solution (40 mg/ml) of Costelan AS100 (polyaminopolyol alkylallylsulfonic acid produced by Costenoble GmbH) acting as the component (B) was charged, and 1.54 ml of a toluene solution (130.17 mg/ml) of diethylaluminum ethoxide acting as the component (C) was added thereto. Thereto, 45.61 ml of toluene was added to prepare an antistatic agent composition 24 in the form of a solution. In 1 ml of this solution, 7.00 mg of Costelan AS100 and 3.50 mg of diethylaluminum ethoxide were contained.

Preparation Example 31

Preparation of Antistatic Agent Composition 25

Into a 100 ml Erlenmeyer flask thoroughly purged with nitrogen, 10.00 ml of a toluene solution (40 mg/ml) of Costelan AS100 (polyaminopolyol alkylallylsulfonic acid produced by Costenoble GmbH) acting as the component (B) was charged, and 0.71 ml of a toluene solution (282.49 mg/ml) of tri-normal-hexylaluminum acting as the component (C) was added thereto. Thereto, 46.43 ml of toluene was added to prepare an antistatic agent composition 25 in the form of a solution. In 1 ml of this solution, 7.00 mg of Costelan AS100 and 3.50 mg of tri-normal-hexylaluminum were contained.

Comparative Example 7-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.27 g of the prepolymerized solid catalyst component (iii) ((A)-a) were charged, and the temperature was elevated to 55° C. Then 6.03 ml of a toluene solution (4.06 mg/ml) of Chemistat 2500 (higher aliphatic amide produced by Sanyo Chemicals Industries, Ltd.) acting as the component (B) and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. Adhesion of polymers to the autoclave wall or impeller was found.

It should be noted that in this autoclave system, 24.50 mg of Chemistat 2500 was present.

Comparative Example 7-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 6.03 ml of a toluene solution (4.06 mg/ml) of Chemistat 2500 (higher aliphatic amide produced by Sanyo Chemicals Industries, Ltd.) acting as the component (B) and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 36.9 g of the polymer was obtained.

It should be noted that in this autoclave system, 24.50 mg of Chemistat 2500 was present.

Example 14-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.27 g of the prepolymerized solid catalyst component (iii) ((A)-a) were charged, and the temperature was elevated to 55° C. It takes approximately 10 minutes until the temperature reaches 55° C. after the addition of ((A)-a). Then 3.5 ml of the antistatic agent composition 11 prepared in Preparation Example 17 and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 24.50 mg of Chemistat 2500 and 12.25 mg of diethylaluminum ethoxide were present.

Example 14-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.5 ml of the antistatic agent composition 11 prepared in Preparation Example 17 and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 81.3 g of the polymer was obtained. The activity ratio was 220% relative to 100% in Comparative Example 7-2.

It should be noted that in this autoclave system, 24.50 mg of Chemistat 2500 and 12.25 mg of diethylaluminum ethoxide were present.

Example 15-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.25 g of the prepolymerized solid catalyst component (iii) ((A)-a) were charged, and the temperature was elevated to 55° C. It takes approximately 10 minutes until the temperature reaches 55° C. after the addition of ((A)-a). Then 3.5 ml of the antistatic agent composition 12 prepared in Preparation Example 18 and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 24.50 mg of Chemistat 2500 and 16.35 mg of diethylaluminum ethoxide were present.

Example 15-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 3.5 ml of the antistatic agent composition 12 prepared in Preparation Example 18 and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 81.1 g of the polymer was obtained. The activity ratio was 220% (relative to 100% in Comparative Example 7-2).

It should be noted that in this autoclave system, 24.50 mg of Chemistat 2500 and 16.35 mg of diethylaluminum ethoxide were present.

Comparative Example 8-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.08 g of the solid catalyst component (i) ((A)-a) prepared in Preparation Example 1 were charged, and the temperature was elevated to 55° C. Then 6.90 ml of a toluene solution (4.06 mg/ml) of Chemistat 2500 (higher aliphatic amide produced by Sanyo Chemicals Industries, Ltd.) acting as the component (B) and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. Adhesion of polymers to the autoclave wall or impeller was found.

It should be noted that in this autoclave system, 28.00 mg of Chemistat 2500 was present.

Comparative Example 8-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 6.90 ml of a toluene solution (4.06 mg/ml) of Chemistat 2500 (higher aliphatic amide produced by Sanyo Chemicals Industries, Ltd.) acting as the component (B) and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 25.6 g of the polymer was obtained.

It should be noted that in this autoclave system, 28.00 mg of Chemistat 2500 was present.

Example 16

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.28 g of the prepolymerized solid catalyst component (iii) ((A)-a) were charged, and the temperature was elevated to 55° C. It takes approximately 10 minutes until the temperature reaches 55° C. after the addition of ((A)-a). Then 4 ml of the antistatic agent composition 11 prepared in Preparation Example 17 and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 28.00 mg of Chemistat 2500 and 14.00 mg of diethylaluminum ethoxide were present.

Example 17-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.30 g of the prepolymerized solid catalyst component (iii) ((A)-a) were charged, and the temperature was elevated to 55° C. It takes approximately 10 minutes until the temperature reaches 55° C. after the addition of ((A)-a). Then 4 ml of the antistatic agent composition 12 prepared in Preparation Example 18 and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 28.00 mg of Chemistat 2500 and 18.68 mg of diethylaluminum ethoxide were present.

Example 17-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 4 ml of the antistatic agent composition 12 prepared in Preparation Example 18 and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 61.2 g of the polymer was obtained. The activity ratio was 239% relative to 100% in Comparative Example 8-2.

It should be noted that in this autoclave system, 28.00 mg of Chemistat 2500 and 18.68 mg of diethylaluminum ethoxide were present.

Example 18-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.08 g of the solid catalyst component (i) ((A)-a) prepared in Preparation Example 1 were charged, and the temperature was elevated to 55° C. It takes approximately 10 minutes until the temperature reaches 55° C. after the addition of ((A)-a). Then 4 ml of the antistatic agent composition 11 prepared in Preparation Example 17 and 0.08 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 28.00 mg of Chemistat 2500 and 14.00 mg of diethylaluminum ethoxide were present.

Example 18-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 4 ml of the antistatic agent composition 11 prepared in Preparation Example 17 and 0.08 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 85.3 g of the polymer was obtained. The activity ratio was 333% relative to 100% in Comparative Example 8-2.

It should be noted that in this autoclave system, 28.00 mg of Chemistat 2500 and 14.00 mg of diethylaluminum ethoxide were present.

Comparative Example 9

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.24 g of the prepolymerized solid catalyst component (iii) ((A)-a) were charged, and the temperature was elevated to 55° C. Then 1.72 ml of a toluene solution (4.06 mg/ml) of Chemistat 2500 (higher aliphatic amide produced by Sanyo Chemicals Industries, Ltd.) acting as the component (B) and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 was present.

Comparative Example 10-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the prepolymerized solid catalyst component (v) ((A)-a) prepared in Preparation Example 14 were charged, and the temperature was elevated to 55° C. Then 1.72 ml of a toluene solution (4.06 mg/ml) of Chemistat 2500 (higher aliphatic amide produced by Sanyo Chemicals Industries, Ltd.) acting as the component (B) and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 was present.

Comparative Example 10-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 1.72 ml of a toluene solution (4.06 mg/ml) of Chemistat 2500 (higher aliphatic amide produced by Sanyo Chemicals Industries, Ltd.) acting as the component (B) and 0.15 g of the prepolymerized solid catalyst component (v) (A) prepared in Preparation Example 14 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 38.5 g of the polymer was obtained.

It should be noted that in this autoclave system, 7.00 mg of Chemistat 2500 was present.

Example 19

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.28 g of the prepolymerized solid catalyst component (iii) ((A)-a) were charged, and the temperature was elevated to 55° C. It takes approximately 10 minutes until the temperature reaches 55° C. after the addition of ((A)-a). Then 1 ml of the antistatic agent composition 11 prepared in Preparation Example 17 and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of diethylaluminum ethoxide were present.

Example 20-1

Case of Adding a Mixed Solution of Components (B) and (C) During Polymerization <Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the prepolymerized solid catalyst component (v) ((A)-a) prepared in Preparation Example 14 were charged, and the temperature was elevated to 55° C. It takes approximately 10 minutes until the temperature reaches 55° C. after the addition of ((A)-a). Then 1 ml of the antistatic agent composition 11 prepared in Preparation Example 17 and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of diethylaluminum ethoxide were present.

Example 20-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 1 ml of the antistatic agent composition 11 prepared in Preparation Example 17 and 0.15 g of the prepolymerized solid catalyst component (v) (A) prepared in Preparation Example 14 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 59.3 g of the polymer was obtained. The activity ratio was 154% relative to 100% in Comparative Example 10-2.

It should be noted that in this autoclave system, 7.00 mg of Chemistat 2500 and 3.50 mg of diethylaluminum ethoxide were present.

Example 21

Case of Adding a Mixed Solution of Components (B) and (C) During Polymerization <Polymerization Method (2): Evaluation of Polymerization Activity>

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 1 ml of the antistatic agent composition 12 prepared in Preparation Example 18 and 0.15 g of the prepolymerized solid catalyst component (v) (A) prepared in Preparation Example 14 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 44.0 g of the polymer was obtained. The activity ratio was 114% relative to 100% in Comparative Example 10-2.

It should be noted that in this autoclave system, 7.00 mg of Chemistat 2500 and 4.67 mg of diethylaluminum ethoxide were present.

Comparative Example 11-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 0.08 g of the solid catalyst component (i) ((A)-a) prepared in Preparation Example 1 was charged, and the temperature was elevated to 55° C. Then 5.17 ml of a toluene solution (4.06 mg/ml) of Chemistat 2500 (higher aliphatic amide produced by Sanyo Chemicals Industries, Ltd.) acting as the component (B) and 0.14 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 21.00 mg of Chemistat 2500 was present.

Comparative Example 11-2

Polymerization Method (2): Evaluation of Polymerization Activity

Into a 1000 ml stainless steel autoclave thoroughly purged with nitrogen, 500 ml of n-heptane was charged, the system was purged with ethylene, and 0.06 ml (0.06 mmol) of 1 mol/L triisobutylaluminum was added. After the mixture was retained at room temperature for 5 minutes, 5.17 ml of a toluene solution (4.06 mg/ml) of Chemistat 2500 (higher aliphatic amide produced by Sanyo Chemicals Industries, Ltd.) acting as the component (B) and 0.14 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 89.7 g of the polymer was obtained.

It should be noted that in this autoclave system, 21.00 mg of Chemistat 2500 was present.

Example 22-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 0.08 g of the solid catalyst component (i) ((A)-a) prepared in Preparation Example 1 was charged, and the temperature was elevated to 55° C. It takes approximately 10 minutes until the temperature reaches 55° C. after the addition of ((A)-a). Then 3 ml of the antistatic agent composition 12 prepared in Preparation Example 18 and 0.14 g of the solid catalyst component (i) ((A)-b) prepared in Preparation Example 1 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 21.00 mg of Chemistat 2500 and 14.00 mg of diethylaluminum ethoxide were present.

Example 22-2

Polymerization Method (2): Evaluation of Polymerization Activity

Into a 1000 ml stainless steel autoclave thoroughly purged with nitrogen, 500 ml of n-heptane was charged, the system was purged with ethylene, and 0.06 ml (0.06 mmol) of 1 mol/L triisobutylaluminum was added. After the mixture was retained at room temperature for 5 minutes, 3 ml of the antistatic agent composition 12 prepared in Preparation Example 18 and 0.14 g of the solid catalyst component (i) (A) prepared in Preparation Example 1 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 103.2 g of the polymer was obtained. The activity ratio was 115% relative to 100% in Comparative Example 11-2.

It should be noted that in this autoclave system, 21.00 mg of Chemistat 2500 and 14.00 mg of diethylaluminum ethoxide were present.

Comparative Example 12-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 0.30 g of the prepolymerized solid catalyst component (v) ((A)-a) prepared in Preparation Example 14 was charged, and the temperature was elevated to 55° C. Then 3.45 ml of a toluene solution (4.06 mg/ml) of Chemistat 2500 (higher aliphatic amide produced by Sanyo Chemicals Industries, Ltd.) acting as the component (B) and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 14.00 mg of Chemistat 2500 was present.

Comparative Example 12-2

Polymerization Method (2): Evaluation of Polymerization Activity

Into a 1000 ml stainless steel autoclave thoroughly purged with nitrogen, 500 ml of n-heptane was charged, the system was purged with ethylene, and 0.06 ml (0.06 mmol) of 1 mol/L triisobutylaluminum was added. After the mixture was retained at room temperature for 5 minutes, 3.45 ml of a toluene solution (4.06 mg/ml) of Chemistat 2500 (higher aliphatic amide produced by Sanyo Chemicals Industries, Ltd.) acting as the component (B) and 0.15 g of the prepolymerized solid catalyst component (v) (A) prepared in Preparation Example 14 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 38.4 g of the polymer was obtained.

It should be noted that in this autoclave system, 14.00 mg of Chemistat 2500 was present.

Example 23-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 0.30 g of the prepolymerized solid catalyst component (v) ((A)-a) prepared in Preparation Example 14 was charged, and the temperature was elevated to 55° C. It takes approximately 10 minutes until the temperature reaches 55° C. after the addition of ((A)-a). Then 2 ml of the antistatic agent composition 11 prepared in Preparation Example 17 and 0.15 g of the prepolymerized solid catalyst component (v) ((A)-b) prepared in Preparation Example 14 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 14.00 mg of Chemistat 2500 and 7.00 mg of diethylaluminum ethoxide were present.

Example 23-2

Polymerization Method (2): Evaluation of Polymerization Activity

Into a 1000 ml stainless steel autoclave thoroughly purged with nitrogen, 500 ml of n-heptane was charged, the system was purged with ethylene, and 0.06 ml (0.06 mmol) of 1 mol/L triisobutylaluminum was added. After the mixture was retained at room temperature for 5 minutes, 2 ml of the antistatic agent composition 11 prepared in Preparation Example 17 and 0.15 g of the prepolymerized solid catalyst component (v) (A) prepared in Preparation Example 14 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 85.5 g of the polymer was obtained. The activity ratio was 223% relative to 100% in Comparative Example 12-2.

It should be noted that in this autoclave system, 14.00 mg of Chemistat 2500 and 7.00 mg of diethylaluminum ethoxide were present.

Comparative Example 13-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the solid catalyst component (vi) ((A)-a) prepared in Preparation Example 15 were charged, and the temperature was elevated to 55° C. Then 6.90 ml of a toluene solution (4.06 mg/ml) of Chemistat 2500 (higher aliphatic amide produced by Sanyo Chemicals Industries, Ltd.) acting as the component (B) and 0.15 g of the solid catalyst component (vi) ((A)-b) prepared in Preparation Example 15 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. Adhesion of polymers to the autoclave wall or impeller was found.

It should be noted that in this autoclave system, 28.00 mg of Chemistat 2500 was present.

Comparative Example 13-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 6.90 ml of a toluene solution (4.06 mg/ml) of Chemistat 2500 (higher aliphatic amide produced by Sanyo Chemicals Industries, Ltd.) acting as the component (B) and 0.15 g of the solid catalyst component (vi) (A) prepared in Preparation Example 15 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 68.1 g of the polymer was obtained.

It should be noted that in this autoclave system, 28.00 mg of Chemistat 2500 was present.

Comparative Example 14

Case of Adding Only Component (B) During Polymerization

<Polymerization method (1): Evaluation of condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the solid catalyst component (vi) ((A)-a) prepared in Preparation Example 15 were charged, and the temperature was elevated to 55° C. Then 10.34 ml of a toluene solution (4.06 mg/ml) of Chemistat 2500 (higher aliphatic amide produced by Sanyo Chemicals Industries, Ltd.) acting as the component (B) and 0.15 g of the solid catalyst component (vi) ((A)-b) prepared in Preparation Example 15 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. Adhesion of polymers to the autoclave wall or impeller was found.

It should be noted that in this autoclave system, 42.00 mg of Chemistat 2500 was present.

Example 24-1

Case of Adding a Mixed Solution of Components (B) and (C) During Polymerization <Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the solid catalyst component (vi) ((A)-a) prepared in Preparation Example 15 were charged, and the temperature was elevated to 55° C. It takes approximately 10 minutes until the temperature reaches 55° C. after the addition of ((A)-a). Then 4 ml of the antistatic agent composition 11 prepared in Preparation Example 17 and 0.15 g of the solid catalyst component (vi) ((A)-b) prepared in Preparation Example 15 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 28.00 mg of Chemistat 2500 and 14.00 mg of diethylaluminum ethoxide were present.

Example 24-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 4 ml of the antistatic agent composition 11 prepared in Preparation Example 17 and 0.15 g of the solid catalyst component (vi) (A) prepared in Preparation Example 15 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 117.2 g of the polymer was obtained. The activity ratio was 172% relative to 100% in Comparative Example 13-2.

It should be noted that in this autoclave system, 28.00 mg of Chemistat 2500 and 14.00 mg of diethylaluminum ethoxide were present.

Example 25-1

Case of Adding a Mixed Solution of Components (B) and (C) During Polymerization <Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the solid catalyst component (vi) ((A)-a) prepared in Preparation Example 15 were charged, and the temperature was elevated to 55° C. It takes approximately 10 minutes until the temperature reaches 55° C. after the addition of ((A)-a). Then 4 ml of the antistatic agent composition 11 prepared in Preparation Example 18 and 0.15 g of the solid catalyst component (vi) ((A)-b) prepared in Preparation Example 15 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 28.00 mg of Chemistat 2500 and 18.68 mg of diethylaluminum ethoxide were present.

Example 25-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 4 ml of the antistatic agent composition 11 prepared in Preparation Example 18 and 0.15 g of the solid catalyst component (vi) (A) prepared in Preparation Example 15 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. As a result, 91.0 g of the polymer was obtained. The activity ratio was 134% relative to 100% in Comparative Example 13-2.

It should be noted that in this autoclave system, 28.00 mg of Chemistat 2500 and 18.68 mg of diethylaluminum ethoxide were present.

Example 26-1

Case of Adding a Mixed Solution of Components (B) and (C) During Polymerization <Polymerization Method (1): Evaluation of Condition of Autoclave Wall>

Into a 1000 ml stainless steel autoclave thoroughly purged with nitrogen, 500 ml of n-heptane was charged, the system was purged with ethylene, 5 ml of 1-hexene and 0.15 g of the solid catalyst component (vi) ((A)-a) prepared in Preparation Example 15 were charged, and the temperature was elevated to 55° C. It takes approximately 10 minutes until the temperature reaches 55° C. after the addition of ((A)-a). Then 2 ml of the antistatic agent composition 11 prepared in Preparation Example 17 and 0.15 g of the solid catalyst component (vi) ((A)-b) prepared in Preparation Example 15 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 14.00 mg of Chemistat 2500 and 7.00 mg of diethylaluminum ethoxide were present.

Example 26-2

Polymerization Method (2): Evaluation of Polymerization Activity

Into a 1000 ml stainless steel autoclave thoroughly purged with nitrogen, 500 ml of n-heptane was charged, the system was purged with ethylene, and 5 ml of 1-hexene and 0.06 ml (0.06 mmol) of 1 mol/L triisobutylaluminum were added. After the mixture was retained at room temperature for 5 minutes, 2 ml of the antistatic agent composition 11 prepared in Preparation Example 17 and 0.15 g of the solid catalyst component (vi) (A) prepared in Preparation Example 15 were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. As a result, 173.2 g of the polymer was obtained. The activity ratio was 254% relative to 100% in Comparative Example 13-2.

It should be noted that in this autoclave system, 14.00 mg of Chemistat 2500 and 7.00 mg of diethylaluminum ethoxide were present.

Comparative Example 15-1

Case of Adding Only Component (B) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.27 g of the prepolymerized solid catalyst component (iii) ((A)-a) were charged, and the temperature was elevated to 55° C. Then 1.72 ml of a toluene solution (4.06 mg/ml) of Chemistat 2500 (higher aliphatic amide produced by Sanyo Chemicals Industries, Ltd.) acting as the component (B) and 0.43 g of the solid catalyst component (iii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 was present.

Comparative Example 15-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1.72 ml of a toluene solution (4.06 mg/ml) of Chemistat 2500 (higher aliphatic amide produced by Sanyo Chemicals Industries, Ltd.) acting as the component (B) and 0.41 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 92% relative to 100% in Comparative Example 13-2.

It should be noted that in this autoclave system, 7.00 mg of Chemistat 2500 was present.

Example 27-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.28 g of the prepolymerized solid catalyst component (iii) ((A)-a) were charged, and the temperature was elevated to 55° C. It takes approximately 10 minutes until the temperature reaches 55° C. after the addition of ((A)-a). Then 1 ml of the antistatic agent composition 13 prepared in Preparation Example 19 and 0.40 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of diisobutylaluminum hydride were present.

Example 27-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 13 prepared in Preparation Example 19 and 0.32 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 117% relative to 100% in Comparative Example 15-2.

It should be noted that in this autoclave system, 7.00 mg of Chemistat 2500 and 3.50 mg of diisobutylaluminum hydride were present.

Example 28-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.27 g of the prepolymerized solid catalyst component (iii) ((A)-a) were charged, and the temperature was elevated to 55° C. It takes approximately 10 minutes until the temperature reaches 55° C. after the addition of ((A)-a). Then 1 ml of the antistatic agent composition 15 prepared in Preparation Example 21 and 0.43 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 5.78 mg of diisobutylaluminum hydride were present.

Example 28-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 15 prepared in Preparation Example 21 and 0.42 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 117% relative to 100% in Comparative Example 15-2.

It should be noted that in this autoclave system, 7.00 mg of Chemistat 2500 and 5.78 mg of diisobutylaluminum hydride were present.

Example 29-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.33 g of the prepolymerized solid catalyst component (iii) ((A)-a) prepared in Preparation Example 2 were charged, and the temperature was elevated to 55° C. It takes approximately 10 minutes until the temperature reaches 55° C. after the addition of ((A)-a). Then 1 ml of the antistatic agent composition 16 prepared in Preparation Example 22 and 0.46 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm²-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of triethylaluminum were present.

Example 29-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 16 prepared in Preparation Example 22 and 0.42 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 113% relative to 100% in Comparative Example 15-2.

It should be noted that in this autoclave system, 7.00 mg of Chemistat 2500 and 3.50 mg of triethylaluminum were present.

Example 30-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.25 g of the prepolymerized solid catalyst component (iii) ((A)-a) were charged, and the temperature was elevated to 55° C. It takes approximately 10 minutes until the temperature reaches 55° C. after the addition of ((A)-a). Then 1 ml of the antistatic agent composition 17 prepared in Preparation Example 23 and 0.42 g of the prepolymerized solid catalyst component (iii) ((A)-b) prepared in Preparation Example 2 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 4.67 mg of triethylaluminum were present.

Example 30-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 16 prepared in Preparation Example 22 and 0.43 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 112% relative to 100% in Comparative Example 15-2.

It should be noted that in this autoclave system, 7.00 mg of Chemistat 2500 and 4.67 mg of triethylaluminum were present.

Example 31-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.30 g of the prepolymerized solid catalyst component (iii) ((A)-a) prepared in Preparation Example 2 were charged, and the temperature was elevated to 55° C. It takes approximately 10 minutes until the temperature reaches 55° C. after the addition of ((A)-a). Then 1 ml of the antistatic agent composition 14 prepared in Preparation Example 20 and 0.40 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 8.75 mg of diisobutylaluminum hydride were present.

Example 31-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 14 prepared in Preparation Example 20 and 0.45 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 113% relative to 100% in Comparative Example 15-2.

It should be noted that in this autoclave system, 7.00 mg of Chemistat 2500 and 8.75 mg of diisobutylaluminum hydride were present.

Example 32-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.30 g of the prepolymerized solid catalyst component (iii) ((A)-a) prepared in Preparation Example 2 were charged, and the temperature was elevated to 55° C. It takes approximately 10 minutes until the temperature reaches 55° C. after the addition of ((A)-a). Then 1 ml of the antistatic agent composition 18 prepared in Preparation Example 24 and 0.40 g of the prepolymerized solid catalyst component (iii) ((A)-b) were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of tri-normal-hexylaluminum were present.

Example 32-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 18 prepared in Preparation Example 24 and 0.43 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 133% relative to 100% in Comparative Example 15-2.

It should be noted that in this autoclave system, 7.00 mg of Chemistat 2500 and 3.50 mg of tri-normal-hexylaluminum were present.

Example 33-1

Case of Adding a Mixed Solution of Components (B) and (C) During Polymerization

<Polymerization Method (1): Evaluation of Condition of Autoclave Wall>

Into a 1000 ml stainless steel autoclave thoroughly purged with nitrogen, 500 ml of n-heptane was charged, the system was purged with ethylene, 20 ml of 1-hexene and 0.30 g of the prepolymerized solid catalyst component (iii) ((A)-a) were charged, and the temperature was elevated to 55° C. It takes approximately 10 minutes until the temperature reaches 55° C. after the addition of ((A)-a). Then 1 ml of the antistatic agent composition 11 prepared in Preparation Example 17 and 0.40 g of the prepolymerized solid catalyst component (vii) ((A)-b) prepared in Preparation Example 16 were added, and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After the termination of the polymerization, the system was depressurized, the polymer was removed, and the condition of the autoclave after the polymerization was observed. No adhesion of polymers to the autoclave wall or impeller was found.

It should be noted that in this autoclave system, 7.00 mg of Chemistat 2500 and 3.50 mg of diethylaluminum ethoxide were present.

Example 33-2

Polymerization Method (2): Evaluation of Polymerization Activity

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 11 prepared in Preparation Example 17 and 0.35 g of the prepolymerized solid catalyst component (vii) (A) prepared in Preparation Example 16 were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 129% relative to 100% in the case where no component (C) was used.

It should be noted that in this autoclave system, 7.00 mg of Chemistat 2500 and 3.50 mg of diethylaluminum ethoxide were present.

Comparative Example 16

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 19 prepared in Preparation Example 25 and 0.43 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 91% relative to 100% in the case where no component (C) was used.

It should be noted that in this autoclave system, 7.00 mg of AMIET 105 and 3.50 mg of diethylaluminum ethoxide were present.

Comparative Example 17

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 20 prepared in Preparation Example 26 and 0.45 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 95% relative to 100% in the case where no component (C) was used.

It should be noted that in this autoclave system, 14.00 mg of EPAN 720 and 3.50 mg of diethylaluminum ethoxide were present.

Comparative Example 18

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 21 prepared in Preparation Example 27 and 0.48 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 85% relative to 100% in the case where no component (C) was used.

It should be noted that in this autoclave system, 7.00 mg of EMULGEN 108 and 3.50 mg of diethylaluminum ethoxide were present.

Comparative Example 19

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 22 prepared in Preparation Example 28 and 0.47 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 78% relative to 100% in the case where no component (C) was used.

It should be noted that in this autoclave system, 7.00 mg of Electro-stripper EA and 3.50 mg of diethylaluminum ethoxide were present.

Comparative Example 20

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 23 prepared in Preparation Example 29 and 0.40 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 94% relative to 100% in the case where no component (C) was used.

It should be noted that in this autoclave system, 7.00 mg of Electro-stripper EA7 and 3.50 mg of diethylaluminum ethoxide were present.

Comparative Example 21

Case of Adding a Mixed Solution of Components (B) and (C) During Polymerization

<Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 24 prepared in Preparation Example 30 and 0.45 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm²-G, polymerization was conducted for 90 minutes. After termination of the polymerization, the system was depressurized and the polymer was filtered, washed, and dried under vacuum at 80° C. for 12 hours. The activity ratio of the polymer obtained was 92% relative to 100% in the case where no component (C) was used.

It should be noted that in this autoclave system, 7.00 mg of Costelan AS100 and 3.50 mg of diethylaluminum ethoxide were present.

Comparative Example 22

Case of Adding a Mixed Solution of Components (B) and (C) During Polymerization <Polymerization Method (2): Evaluation of Polymerization Activity>

Into a 1000 ml stainless steel autoclave thoroughly purged with nitrogen, 500 ml of n-heptane was charged, the system was purged with ethylene, and 20 ml of 1-hexene and 0.06 ml (0.06 mmol) of 1 mol/L triisobutylaluminum were added. After the mixture was retained at room temperature for 5 minutes, 1 ml of the antistatic agent composition 25 prepared in Preparation Example 31 and 0.53 g of the prepolymerized solid catalyst component (iii) (A) were added thereto and the temperature in the system was elevated to 73° C. Ethylene was then introduced to start polymerization. While continuously supplying ethylene so that the pressure was maintained at 8.0 kg/cm$^2$-G, polymerization was conducted for 90 minutes. After termination of the polymerization, the system was depressurized and the polymer was filtered, washed, and dried under vacuum at 80° C. for 12 hours. The activity ratio of the polymer obtained was 96% relative to 100% in the case where no component (C) was used.

It should be noted that in this autoclave system, 7.00 mg of Costelan AS100 and 3.50 mg of tri-normal-hexylaluminum were present.

Table 1 shows the summary of the evaluation of the condition of the autoclave wall evaluated through the polymerization method (1) in Examples 1-1 to 9-1 and Comparative Examples 1, 2-1, and 3-1.

Table 2 shows the summary of the evaluation of the polymerization activity evaluated through the polymerization method (2) in Examples 1-2 to 9-2 and Comparative Examples 2-2 and 3-2.

Table 3 shows the summary of the evaluation of the condition of the autoclave wall evaluated through the polymerization method (1) in Examples 10-1 to 12-1 and Comparative Example 4-1.

Table 4 shows the summary of the evaluation of the polymerization activity evaluated through the polymerization method (2) in Examples 10-2 to 12-2 and Comparative Example 4-2.

Table 5 shows the summary of the evaluation of the operability for gas-phase polymerization in Example 13 and Comparative Examples 5 and 6.

Table 6 shows the summary of the evaluation of the condition of the autoclave wall evaluated through the polymerization method (1) in Examples 14-1 to 26-1 and Comparative Examples 7-1 to 14.

Table 7 shows the summary of the evaluation of the polymerization activity evaluated through the polymerization method (2) in Examples 14-2 to 26-2 and Comparative Examples 7-2 to 13-2.

Table 8 shows the summary of the evaluation of the condition of the autoclave wall evaluated through the polymerization method (1) in Examples 27-1 to 33-1 and Comparative Example 15-1.

Table 9 shows the summary of the evaluation of the polymerization activity evaluated through the polymerization method (2) in Examples 27-2 to 33-2 and Comparative Example 15-2.

Table 10 shows the summary of the evaluation of the polymerization activity evaluated through the polymerization method (2) in Comparative Examples 16 to 22.

TABLE 1

Polymerization method (1)
Evaluation of condition of autoclave wall

| | Catalyst (A-a) g | Catalyst (A-b) g | Component (B) | Component (C) | Components (B) + (C) Charge method | Mixed solution of (B) and (C) Component (B) mg | Component (C) mg |
|---|---|---|---|---|---|---|---|
| Example 1-1 | 0.58 | 0.61 | Chemistat 2500 | Et$_2$Al(OEt)*$^1$ | Method (1)*$^3$ | 9.0 | 6.0 |
| Comparative Example 1 | 0.64 | 0.61 | None | None | — | 0.0 | 0.0 |
| Comparative Example 2-1 | 0.62 | 0.68 | Chemistat 2500 | None | — | 0.0 | 0.0 |
| Example 2-1 | 0.65 | 0.68 | Chemistat 2500 | Et$_2$Al(OEt)*$^1$ | Method (1)*$^3$ | 9.0 | 3.0 |
| Example 3-1 | 0.59 | 0.58 | Chemistat 2500 | Et$_2$Al(OEt)*$^1$ | Method (1)*$^3$ | 9.0 | 9.0 |
| Example 4-1 | 0.60 | 0.60 | Chemistat 2500 | Et$_2$Al(OEt)*$^1$ | Method (1)*$^3$ | 9.0 | 1.5 |
| Example 5-1 | 0.60 | 0.60 | Chemistat 2500 | Et$_2$Al(OEt)*$^1$ | Method (1)*$^3$ | 9.0 | 10.5 |
| Example 6-1 | 0.60 | 0.60 | Chemistat 2500 | Et$_2$Al(OEt)*$^1$ | Method (1)*$^3$ | 9.0 | 12.0 |
| Example 7-1 | 0.60 | 0.60 | Chemistat 2500 | Et$_2$Al(OEt)*$^1$ | Method (1)*$^3$ | 9.0 | 18.0 |
| Example 8-1 | 0.60 | 0.60 | Chemistat 2500 | Et$_2$Al(OEt)*$^1$ | Method (1)*$^3$ | 12.0 | 6.0 |
| Comparative Example 3-1 | 0.68 | 0.54 | Chemistat 2500 | None | — | 0.0 | 0.0 |
| Example 9-1 | 0.60 | 0.60 | Chemistat 2500 | iBu$_3$Al*$^2$ | Method (1)*$^3$ | 9.0 | 12.0 |

TABLE 1-continued

Polymerization method (1)
Evaluation of condition of autoclave wall

|  | Separately charged amount | | (B) + (C) mixing ratio | | Adhesion to wall*6 | Component (C)/(B) (Molar ratio) |
|---|---|---|---|---|---|---|
|  | Component (B) mg | Component (C) mg | Component (B) mg | Component (C) mg | | |
| Example 1-1 | 0.0 | 0.0 | 9.0 | 6.0 | A | 1.47 |
| Comparative Example 1 | 0.0 | 0.0 | 0.0 | 0.0 | C | — |
| Comparative Example 2-1 | 9.0 | 0.0 | 9.0 | 0.0 | B | — |
| Example 2-1 | 0.0 | 0.0 | 9.0 | 3.0 | A | 0.73 |
| Example 3-1 | 0.0 | 0.0 | 9.0 | 9.0 | A | 2.20 |
| Example 4-1 | 0.0 | 0.0 | 9.0 | 1.5 | A | 0.37 |
| Example 5-1 | 0.0 | 0.0 | 9.0 | 10.5 | A | 2.57 |
| Example 6-1 | 0.0 | 0.0 | 9.0 | 12.0 | A | 2.94 |
| Example 7-1 | 0.0 | 0.0 | 9.0 | 18.0 | A | 4.41 |
| Example 8-1 | 0.0 | 0.0 | 12.0 | 6.0 | A | 1.10 |
| Comparative Example 3-1 | 24.0 | 0.0 | 24.0 | 0.0 | A | — |
| Example 9-1 | 0.0 | 0.0 | 9.0 | 12.0 | A | 1.93 |

*1Et$_2$Al(OEt) = Diethylaluminum ethoxide
*2iBu$_3$Al = Triisobutylaluminum
*3Method (1) = Components (B) and (C) were pre-mixed and charged into the polymerization vessel.
*6A = No adhesion of polymers to the autoclave wall or impeller was observed.
B = Slight adhesion of polymers to the autoclave wall or impeller was observed.
C = Extensive adhesion of polymers to the autoclave wall or impeller was observed.

TABLE 2

Polymerization method (2)
Evaluation of polymerization activity

|  | Catalyst (A) g | Component (B) | Component (C) | (B) + (C) Charge method | Charged amount of (B) + (C) mixture | | Separately Charged Amount | | (B) + (C) mixing ratio (in the polymerization vessel) | | Yield g | Mileage g-PE/ g-cat | Component (C)/(B) molar ratio |
|---|---|---|---|---|---|---|---|---|---|---|---|---|---|
|  |  |  |  |  | Component (B) mg | Component (C) mg | Component (B) mg | Component (C) mg | Component (B) mg | Component (C) mg |  |  |  |
| Example 1-2 | 0.40 | Chemistat 2500 | Et$_2$Al(OEt)*1 | Method (1)*3 | 5.25 | 3.50 | 0 | 0 | 5.25 | 3.50 | 152.5 | 381 | 1.47 |
| Comparative Example 2-2 | 0.40 | Chemistat 2500 | None | — | 0 | 0 | 5.25 | 0 | 5.25 | 0.00 | 129.6 | 324 | 0.00 |
| Example 2-2 | 0.40 | Chemistat 2500 | Et$_2$Al(OEt)*1 | Method (1)*3 | 5.25 | 1.75 | 0 | 0 | 5.25 | 1.75 | 146.5 | 366 | 0.73 |
| Example 3-2 | 0.40 | Chemistat 2500 | Et$_2$Al(OEt)*1 | Method (1)*3 | 5.25 | 5.25 | 0 | 0 | 5.25 | 5.25 | 142.5 | 356 | 2.20 |
| Example 4-2 | 0.40 | Chemistat 2500 | Et$_2$Al(OEt)*1 | Method (1)*3 | 5.25 | 0.88 | 0 | 0 | 5.25 | 0.88 | 141.2 | 353 | 0.37 |
| Example 5-2 | 0.40 | Chemistat 2500 | Et$_2$Al(OEt)*1 | Method (1)*3 | 5.25 | 6.13 | 0 | 0 | 5.25 | 6.13 | 122.4 | 306 | 2.57 |
| Example 6-2 | 0.40 | Chemistat 2500 | Et$_2$Al(OEt)*1 | Method (1)*3 | 5.25 | 7.00 | 0 | 0 | 5.25 | 7.00 | 110.6 | 277 | 2.94 |
| Example 7-2 | 0.40 | Chemistat 2500 | Et$_2$Al(OEt)*1 | Method (1)*3 | 5.25 | 10.50 | 0 | 0 | 5.25 | 10.50 | 108.0 | 270 | 4.41 |
| Example 8-2 | 0.40 | Chemistat 2500 | Et$_2$Al(OEt)*1 | Method (1)*3 | 7.00 | 3.50 | 0 | 0 | 7.00 | 3.50 | 138.0 | 345 | 1.10 |
| Comparative Example 3-2 | 0.40 | Chemistat 2500 | None | — | 0 | 0 | 14.00 | 0 | 14.00 | 0.00 | 90.4 | 226 | — |
| Example 9-2 | 0.40 | Chemistat 2500 | iBu$_3$Al*2 | Method (1)*3 | 5.25 | 7.00 | 0 | 0 | 5.25 | 7.00 | 178.2 | 446 | 1.93 |

*1Et$_2$Al(OEt) = Diethylaluminum ethoxide
*2iBu$_3$Al = Triisobutylaluminum
*3Method (1) = Components (B) and (C) were pre-mixed and charged into the polymerization vessel.

TABLE 3

Polymerization method (1)
Evaluation of condition of autoclave wall

| | Catalyst (A-a) g | Catalyst (A-b) g | Component (B) | Component (C) | Components (B) + (C) Charge method | Mixed solution of (B) and (C) Component (B) mg | Component (C) mg |
|---|---|---|---|---|---|---|---|
| Example 10-1 | 0.65 | 0.68 | Chemistat 2500 | Et$_2$Al(OEt)*[1] | Method (1)*[3] | 9.0 | 3.0 |
| Example 11-1 | — | 0.60 | Chemistat 2500 | Et$_2$Al(OEt)*[1] | Method (2)*[4] | 3.9 | 3.0 |
| Example 12-1 | — | 0.60 | Chemistat 2500 | Et$_2$Al(OEt)*[1] | Method (3)*[5] | 0.0 | 0.0 |
| Comparative Example 4-1 | 0.60 | 0.60 | Chemistat 2500 | None | — | 0.0 | 0.0 |

| | Separately charged amount Component (B) mg | Component (C) mg | (B) + (C) mixing ratio Component (B) mg | Component (C) mg | Adhesion to wall*[6] | Component (C)/(B) (Molar ratio) |
|---|---|---|---|---|---|---|
| Example 10-1 | 0.0 | 0.0 | 9.0 | 3.0 | A | 0.73 |
| Example 11-1 | 5.1 | 0.0 | 9.0 | 3.0 | A | 0.73 |
| Example 12-1 | 9.0 | 3.0 | 9.0 | 3.0 | A | 0.73 |
| Comparative Example 4-1 | 9.0 | 0.0 | 9.0 | 0.0 | B | — |

*[1]Et$_2$Al(OEt) = Diethylaluminum ethoxide

*[3]Method (1) = Components (B) and (C) were pre-mixed and charged into the polymerization vessel.

*[4]Method (2) = A premixture of (B) and (C) and separate component (B) were sequentially charged into the polymerization vessel.

*[5]Method (3) = Components (B) and (C) were separately and sequentially charged into the polymerization vessel.

*[6]A = No adhesion of polymers to the autoclave wall or impeller was observed.

B = Slight adhesion of polymers to the autoclave wall or impeller was observed.

C = Extensive adhesion of polymers to the autoclave wall or impeller was observed.

TABLE 4

Polymerization method (2)
Evaluation of polymerization activity (2)

| | Catalyst (A) g | Component (B) | Component (C) | (B) + (C) Charge method | Charge amount of (B) + (C) mixture Component (B) mg | Component (C) mg | Separately charged amount Component (B) mg | Component (C) mg | (B) + (C) mixing ratio (in the polymerization vessel) Component (B) mg | Component (C) mg | Yield g | Mileage g-PE/g-cat | Component (C)/(B) molar ratio |
|---|---|---|---|---|---|---|---|---|---|---|---|---|---|
| Example 10-2 | 0.43 | Chemistat 2500 | Et$_2$Al(OEt)*[1] | Method (1)*[3] | 5.25 | 1.75 | 0 | 0 | 5.25 | 1.75 | 147.1 | 341 | 0.73 |
| Example 11-2 | 0.37 | Chemistat 2500 | Et$_2$Al(OEt)*[1] | Method (2)*[4] | 2.27 | 1.75 | 2.98 | 0 | 5.25 | 1.75 | 119.2 | 323 | 0.73 |
| Example 12-2 | 0.36 | Chemistat 2500 | Et$_2$Al(OEt)*[1] | Method (3)*[5] | 0 | 0 | 5.25 | 1.75 | 5.25 | 1.75 | 104.4 | 287 | 0.73 |
| Comparative Example 4-2 | 0.40 | Chemistat 2500 | None | — | 0 | 0 | 5.25 | 0 | 5.25 | 0.00 | 115.8 | 287 | — |

*[1]Et$_2$Al(OEt) = Diethylaluminum ethoxide

*[3]Method (1) = Components (B) and (C) were pre-mixed and charged into the polymerization vessel.

*[4]Method (2) = A premixture of (B) and (C) and separate component (B) were sequentially charged into the polymerization vessel.

*[5]Method (3) = Components (B) and (C) were separately and sequentially charged into the polymerization vessel.

TABLE 5

Evaluation of operability by gas-phase polymerization

| | | | Charged into polymerization system as a mixture α*7 | | Separately charged into poly- merization system | Total charged amount*8 | | Mileage | |
|---|---|---|---|---|---|---|---|---|---|
| | Component (B) | Component (C) | Component (B) | Component (C) | Component (B) | Component (B) | Component (C) | (g-PE/ g-cat · h · MPaG) | Stable opera- bility*9 |
| | | | Supply concentration (vs. production rate) ppm | | | | | | |
| Example 13 | Chemistat 2500 | Et₂Al(OEt)*1 | 9 | 7 | 21 | 30 | 7 | 578 | A |
| Comparative Example 5 | Chemistat 2500 | — | 0 | 0 | 43 | 43 | 0 | 510 | A |
| Comparative Example 6 | Chemistat 2500 | — | 0 | 0 | 38 | 38 | 0 | 536 | C |

*1 Et₂Al(OEt) = Diethylaluminum ethoxide

*7 Mixed solution α = A 9:7 (weight) mixture of Chemistat 2500 (component (B)) and diethylaluminum ethoxide (component I(C)).

*8 Total amount charged = A total amount of Chemistat charged as the mixture A and Chemistat charged separately.

*9 A = Stable operation was achieved

C = Stable operation was not achieved.

TABLE 6

Polymerization method (1)
Evaluation of condition of autoclave wall

| | Catalyst (A-a) | | Catalyst (A-b) | | Como- nomer 1-hex- ene | Com- ponent (B) | Com- ponent (C) | (B) + (C) Charge method | (B) + (C) mixing ratio | | Adhe- sion to wall*6 | (C)/ (B) weight ratio | (C)/ (B) molar ratio |
|---|---|---|---|---|---|---|---|---|---|---|---|---|---|
| | Name | g | Name | g | ml | | | | Com- ponent (B) mg | Com- ponent (C) mg | | | |
| Comparative Example 7-1 | (iii) | 0.27 | (i) | 0.08 | 20 | Chemistat 2500 | None | — | 24.50 | 0.00 | C | 0.00 | 0.00 |
| Example 14-1 | (iii) | 0.28 | (i) | 0.08 | 20 | Chemistat 2500 | Et₂Al(OEt)*1 | Method (1)*3 | 24.50 | 12.25 | A | 0.50 | 1.10 |
| Example 15-1 | (iii) | 0.25 | (i) | 0.08 | 20 | Chemistat 2500 | Et₂Al(OEt)*1 | Method (1)*3 | 24.50 | 16.35 | A | 0.67 | 1.47 |
| Comparative Example 8-1 | (i) | 0.08 | (i) | 0.08 | 20 | Chemistat 2500 | None | — | 28.00 | 0.00 | C | 0.00 | 0.00 |
| Example 16 | (iii) | 0.28 | (i) | 0.08 | 20 | Chemistat 2500 | Et₂Al(OEt)*1 | Method (1)*3 | 28.00 | 14.00 | A | 0.50 | 1.10 |
| Example 17-1 | (iii) | 0.30 | (i) | 0.08 | 20 | Chemistat 2500 | Et₂Al(OEt)*1 | Method (1)*3 | 28.00 | 18.68 | A | 0.67 | 1.47 |
| Example 18-1 | (i) | 0.08 | (i) | 0.08 | 20 | Chemistat 2500 | Et₂Al(OEt)*1 | Method (1)*3 | 28.00 | 14.00 | A | 0.50 | 1.10 |
| Comparative Example 9 | (iii) | 0.24 | (v) | 0.15 | 5 | Chemistat 2500 | None | — | 7.00 | 0.00 | A | 0.00 | 0.00 |
| Comparative Example 10-1 | (v) | 0.15 | (v) | 0.15 | 5 | Chemistat 2500 | None | — | 7.00 | 0.00 | A | 0.00 | 0.00 |
| Example 19 | (iii) | 0.28 | (v) | 0.15 | 5 | Chemistat 2500 | Et₂Al(OEt)*1 | Method (1)*3 | 7.00 | 3.50 | A | 0.50 | 1.10 |
| Example 20-1 | (v) | 0.15 | (v) | 0.15 | 5 | Chemistat 2500 | Et₂Al(OEt)*1 | Method (1)*3 | 7.00 | 3.50 | A | 0.50 | 1.10 |
| Comparative Example 11-1 | (i) | 0.08 | (i) | 0.14 | 0 | Chemistat 2500 | None | — | 21.00 | 0.00 | A | 0.00 | 0.00 |
| Example 22-1 | (i) | 0.08 | (i) | 0.14 | 0 | Chemistat 2500 | Et₂Al(OEt)*1 | Method (1)*3 | 21.00 | 14.00 | A | 0.67 | 1.47 |
| Comparative Example 12-1 | (v) | 0.30 | (v) | 0.15 | 0 | Chemistat 2500 | None | — | 14.00 | 0.00 | A | 0.00 | 0.00 |
| Example 23-1 | (v) | 0.30 | (v) | 0.15 | 0 | Chemistat 2500 | Et₂Al(OEt)*1 | Method (1)*3 | 14.00 | 7.00 | A | 0.50 | 1.10 |
| Comparative Example 13-1 | (vi) | 0.15 | (vi) | 0.15 | 5 | Chemistat 2500 | None | — | 28.00 | 0.00 | C | 0.00 | 0.00 |
| Comparative Example 14 | (vi) | 0.15 | (vi) | 0.15 | 5 | Chemistat 2500 | None | — | 42.00 | 0.00 | C | 0.00 | 0.00 |
| Example 24-1 | (vi) | 0.15 | (vi) | 0.15 | 5 | Chemistat 2500 | Et₂Al(OEt)*1 | Method (1)*3 | 28.00 | 14.00 | A | 0.50 | 1.10 |
| Example 25-1 | (vi) | 0.15 | (vi) | 0.15 | 5 | Chemistat 2500 | Et₂Al(OEt)*1 | Method (1)*3 | 28.00 | 18.68 | A | 0.67 | 1.47 |
| Example 26-1 | (vi) | 0.15 | (vi) | 0.15 | 5 | Chemistat 2500 | Et₂Al(OEt)*1 | Method (1)*3 | 14.00 | 7.00 | A | 0.50 | 1.10 |

*1 Et₂Al(OEt) = Diethylaluminum ethoxide

*3 Method (1) = Components (B) and (C) were pre-mixed and charged into the polymerization vessel.

*6 A = No adhesion of polymers to the autoclave wall or impeller was observed.

B = Slight adhesion of polymers to the autoclave wall or impeller was observed.

C = Extensive adhesion of polymers to the autoclave wall or impeller was observed.

TABLE 7

Polymerization method (2)
Evaluation of polymerization activity

| | Catalyst (A) | | Comonomer 1-hexene | Component (B) | Component (C) | (B) + (C) Charge method | (B) + (C) mixing ratio (in polymerization vessel) Component (B) mg | Component (C) mg | Yield g | Mileage g-PE/ g-cat | Activity ratio | Component (C)/(B) Weight ratio | Component (C)/(B) Molar ratio |
|---|---|---|---|---|---|---|---|---|---|---|---|---|---|
| | Name | g | ml | | | | | | | | | | |
| Comparative Example 7-2 | (i) | 0.08 | 20 | Chemistat 2500 | None | — | 24.50 | 0.00 | 36.9 | 492 | 100% | 0.00 | 0.00 |
| Example 14-2 | (i) | 0.08 | 20 | Chemistat 2500 | Et$_2$Al(OEt)*[1] | Method (1)*[3] | 24.50 | 12.25 | 81.3 | 1084 | 220% | 0.50 | 1.10 |
| Example 15-2 | (i) | 0.08 | 20 | Chemistat 2500 | Et$_2$Al(OEt)*[1] | Method (1)*[3] | 24.50 | 16.35 | 81.1 | 1081 | 220% | 0.67 | 1.47 |
| Comparative Example 8-2 | (i) | 0.08 | 20 | Chemistat 2500 | None | — | 28.00 | 0.00 | 25.6 | 341 | 100% | 0.00 | 0.00 |
| Example 17-2 | (i) | 0.08 | 20 | Chemistat 2500 | Et$_2$Al(OEt)*[1] | Method (1)*[3] | 28.00 | 18.68 | 61.2 | 815 | 239% | 0.67 | 1.47 |
| Example 18-2 | (i) | 0.08 | 20 | Chemistat 2500 | Et$_2$Al(OEt)*[1] | Method (1)*[3] | 28.00 | 14.00 | 85.3 | 1137 | 333% | 0.50 | 1.10 |
| Comparative Example 10-2 | (v) | 0.15 | 5 | Chemistat 2500 | None | — | 7.00 | 0.00 | 38.5 | 257 | 100% | 0.00 | 0.00 |
| Example 20-2 | (v) | 0.15 | 5 | Chemistat 2500 | Et$_2$Al(OEt)*[1] | Method (1)*[3] | 7.00 | 3.50 | 59.3 | 395 | 154% | 0.50 | 1.10 |
| Example 21 | (v) | 0.15 | 5 | Chemistat 2500 | Et$_2$Al(OEt)*[1] | Method (1)*[3] | 7.00 | 4.67 | 44.0 | 293 | 114% | 0.67 | 1.47 |
| Comparative Example 11-2 | (i) | 0.14 | 0 | Chemistat 2500 | None | — | 21.00 | 0.00 | 89.7 | 664 | 100% | 0.00 | 0.00 |
| Example 22-2 | (i) | 0.14 | 0 | Chemistat 2500 | Et$_2$Al(OEt)*[1] | Method (1)*[3] | 21.00 | 14.00 | 103.2 | 764 | 115% | 0.67 | 1.47 |
| Comparative Example 12-2 | (v) | 0.15 | 0 | Chemistat 2500 | None | — | 14.00 | 0.00 | 38.4 | 256 | 100% | 0.00 | 0.00 |
| Example 23-2 | (v) | 0.15 | 0 | Chemistat 2500 | Et$_2$Al(OEt)*[1] | Method (1)*[3] | 14.00 | 7.00 | 85.5 | 570 | 223% | 0.50 | 1.10 |
| Comparative Example 13-2 | (vi) | 0.15 | 5 | Chemistat 2500 | None | — | 28.00 | 0.00 | 68.1 | 454 | 100% | 0.00 | 0.00 |
| Example 24-2 | (vi) | 0.15 | 5 | Chemistat 2500 | Et$_2$Al(OEt)*[1] | Method (1)*[3] | 28.00 | 14.00 | 117.2 | 781 | 172% | 0.50 | 1.10 |
| Example 25-2 | (vi) | 0.15 | 5 | Chemistat 2500 | Et$_2$Al(OEt)*[1] | Method (1)*[3] | 28.00 | 18.68 | 91.0 | 607 | 134% | 0.67 | 1.47 |
| Example 26-2 | (vi) | 0.15 | 5 | Chemistat 2500 | Et$_2$Al(OEt)*[1] | Method (1)*[3] | 14.00 | 7.00 | 173.2 | 1155 | 254% | 0.50 | 1.10 |

*[1] Et$_2$Al(OEt) = Diethylaluminum ethoxide
*[3] Method (1) = Components (B) and (C) were pre-mixed and charged into the polymerization vessel.

TABLE 8

Polymerization method (1)
Evaluation of condition of autoclave wall

| | Catalyst (A-a) | | Catalyst (A-b) | | Comonomer 1-hexene ml | Component (B) | Component (C) | (B) + (C) Charge method | (B) + (C) mixing ratio Component (B) mg | Component (C) mg | Adhesion to wall*[6] | (C)/(B) weight ratio | (C)/(B) molar ratio |
|---|---|---|---|---|---|---|---|---|---|---|---|---|---|
| | Name | g | Name | g | | | | | | | | | |
| Comparative Example 15-1 | (iii) | 0.27 | (iii) | 0.43 | 20 | Chemistat 2500 | None | — | 7.00 | 0.00 | B | 0.00 | 0.00 |
| Example 27-1 | (iii) | 0.28 | (iii) | 0.40 | 20 | Chemistat 2500 | iBu$_2$AlH*[10] | Method (1)*[3] | 7.00 | 3.50 | A | 0.50 | 1.01 |
| Example 28-1 | (iii) | 0.27 | (iii) | 0.43 | 20 | Chemistat 2500 | iBu$_2$AlH*[10] | Method (1)*[3] | 7.00 | 5.78 | A | 0.83 | 1.67 |
| Example 29-1 | (iii) | 0.33 | (iii) | 0.46 | 20 | Chemistat 2500 | Et$_3$Al*[11] | Method (1)*[3] | 7.00 | 3.50 | A | 0.50 | 1.26 |
| Example 30-1 | (iii) | 0.25 | (iii) | 0.42 | 20 | Chemistat 2500 | Et$_3$Al*[11] | Method (1)*[3] | 7.00 | 4.67 | A | 0.67 | 1.68 |
| Example 31-1 | (iii) | 0.30 | (iii) | 0.40 | 20 | Chemistat 2500 | iBu$_2$AlH*[10] | Method (1)*[3] | 7.00 | 8.75 | A | 1.25 | 3.14 |

TABLE 8-continued

Polymerization method (1)
Evaluation of condition of autoclave wall

| | Catalyst (A-a) | | Catalyst (A-b) | | 1-hexene | Comonomer Component (B) | Component (C) | (B) + (C) Charge method | (B) + (C) mixing ratio Component (B) mg | (B) + (C) mixing ratio Component (C) mg | Adhesion to wall*6 | (C)/(B) weight ratio | (C)/(B) molar ratio |
|---|---|---|---|---|---|---|---|---|---|---|---|---|---|
| | Name | g | Name | g | ml | | | | | | | | |
| Example 32-1 | (iii) | 0.30 | (iii) | 0.40 | 20 | Chemistat 2500 | nHex$_3$Al*12 | Method (1)*3 | 7.00 | 3.50 | A | 0.50 | 0.51 |
| Example 33-1 | (iii) | 0.30 | (vii) | 0.40 | 20 | Chemistat 2500 | Et$_2$Al(OEt)*1 | Method (1)*3 | 7.00 | 3.50 | A | 0.50 | 0.51 |

*1 Et$_2$Al(OEt) = Diethylaluminum ethoxide

*3 Method (1) = Components (B) and (C) were pre-mixed and charged into the polymerization vessel.

*6 A = No adhesion of polymers to the autoclave wall or impeller was observed.

B = Slight adhesion of polymers to the autoclave wall or impeller was observed.

C = Extensive adhesion of polymers to the autoclave wall or impeller was observed.

*10 iBu$_2$AlH = Diisobutylaluminum hydride

*11 Et$_3$Al = Triethylaluminum

*12 nHex$_3$Al = Tri-normal-hexylaluminum

TABLE 9

Polymerization method (2)
Evaluation of polymerization activity

| | Catalyst (A) | | 1-hexene ml | Comonomer Component (B) | Component (C) | (B) + (C) Charge method | (B) + (C) mixing ratio (in polymerization vessel) Component (B) mg | (B) + (C) mixing ratio (in polymerization vessel) Component (C) mg |
|---|---|---|---|---|---|---|---|---|
| | Name | g | | | | | | |
| Comparative Example 15-2 | (iii) | 0.41 | 20 | Chemistat 2500 | None | — | 7.00 | 0.00 |
| Example 27-2 | (iii) | 0.32 | 20 | Chemistat 2500 | iBu$_2$AlH*10 | Method (1)*3 | 7.00 | 3.50 |
| Example 28-2 | (iii) | 0.42 | 20 | Chemistat 2500 | iBu$_2$AlH*10 | Method (1)*3 | 7.00 | 5.78 |
| Example 29-2 | (iii) | 0.42 | 20 | Chemistat 2500 | Et$_3$Al*11 | Method (1)*3 | 7.00 | 3.50 |
| Example 30-2 | (iii) | 0.43 | 20 | Chemistat 2500 | Et$_3$Al*11 | Method (1)*3 | 7.00 | 4.67 |
| Example 31-2 | (iii) | 0.45 | 20 | Chemistat 2500 | iBu$_2$AlH*10 | Method (1)*3 | 7.00 | 8.75 |
| Example 32-2 | (iii) | 0.43 | 20 | Chemistat 2500 | nHex$_3$Al*12 | Method (1)*3 | 7.00 | 3.50 |
| Example 33-2 | (vii) | 0.35 | 20 | Chemistat 2500 | Et$_2$Al(OEt)*1 | Method (1)*3 | 7.00 | 3.50 |

| | Activity ratio | (C)/(B) Weight ratio | (C)/(B) Molar ratio | (C)/(B) Molar ratio |
|---|---|---|---|---|
| Comparative Example 15-2 | 100%*13 | 0.00 | 0.00 | 0.00 |
| Example 27-2 | 117%*13 | 0.50 | 1.01 | 1.01 |
| Example 28-2 | 117%*13 | 0.83 | 1.67 | 1.67 |
| Example 29-2 | 113%*13 | 0.50 | 1.26 | 1.26 |
| Example 30-2 | 112%*13 | 0.67 | 1.68 | 1.68 |
| Example 31-2 | 113%*13 | 1.25 | 2.52 | 2.52 |
| Example 32-2 | 133%*13 | 0.50 | 1.01 | 1.01 |
| Example 33-2 | 129%*14 | 0.50 | 1.01 | 1.01 |

*1 Et$_2$Al(OEt) = Diethylaluminum ethoxide

*3 Method (1) = Components (B) and (C) were pre-mixed and charged into the polymerization vessel.

*10 iBu$_2$AlH = Diisobutylaluminum hydride

*11 Et$_3$Al = Triethylaluminum

*12 nHex$_3$Al = Tri-normal-hexylaluminum

*13 Activity ratio when that of Comparative Example 15-2 is 100%.

*14 Activity ratio when the activity of the example in which no component (C) is used is 100%.

TABLE 10

Polymerization method (2)
Evaluation of polymerization activity

| | Catalyst (A) | | Comonomer 1-hexene | Component (B) | Component (C) | (B) + (C) Charge method | (B) + (C) mixing ratio (in polymerization vessel) Component (B) mg | (B) + (C) mixing ratio (in polymerization vessel) Component (C) mg | Activity ratio*[15] | Component (C)/(B) Weight ratio |
|---|---|---|---|---|---|---|---|---|---|---|
| | Name | g | ml | | | | | | | |
| Comparative Example 16 | (iii) | 0.43 | 20 | AMIET 105 | $Et_2Al(OEt)$*[1] | Method (1)*[3] | 7.0 | 3.5 | 91% | 0.50 |
| Comparative Example 17 | (iii) | 0.45 | 20 | EPAN 720 | $Et_2Al(OEt)$*[1] | Method (1)*[3] | 14.0 | 3.5 | 95% | 0.25 |
| Comparative Example 18 | (iii) | 0.48 | 20 | EMULGEN 108 | $Et_2Al(OEt)$*[1] | Method (1)*[3] | 7.0 | 3.5 | 85% | 0.50 |
| Comparative Example 19 | (iii) | 0.47 | 20 | Electro-stripper EA | $Et_2Al(OEt)$*[1] | Method (1)*[3] | 7.0 | 7.0 | 78% | 1.00 |
| Comparative Example 20 | (iii) | 0.4 | 20 | Electro-stripper EA-7 | $Et_2Al(OEt)$*[1] | Method (1)*[3] | 7.0 | 3.5 | 94% | 0.50 |
| Comparative Example 21 | (iii) | 0.45 | 20 | Costelan AS 100 | $Et_2Al(OEt)$*[1] | Method (1)*[3] | 7.0 | 3.5 | 92% | 0.50 |
| Comparative Example 22 | (iii) | 0.53 | 20 | Costelan AS 100 | $nHex_3Al$*[12] | Method (1)*[3] | 7.0 | 3.5 | 96% | 0.50 |

*[1]$Et_2Al(OEt)$ = Diethylaluminum ethoxide
*[3]Method (1) = Components (B) and (C) were pre-mixed and charged into the polymerization vessel.
*[12]$nHex_3Al$ = Tri-normal-hexylaluminum
*[15]Activity ratio when the activity of the example in which no component (C) is used is 100%.

INDUSTRIAL APPLICABILITY

According to the present invention, olefin (co)polymerization is conducted in a polymerization vessel containing both an aliphatic amide (B) and an organoaluminum compound (C). Since this reduces the decrease in polymerization activity of the olefin and effectively ensures the flowability inside the polymerization vessel without decreasing the production rate, thereby preventing adhesion of polymers to the vessel wall or impeller, long-term stable operation can be achieved in high activity and an olefin polymer having good particle properties can be produced.

The production method is applicable to a wide range of processes, such as suspension polymerization, solution polymerization and gas-phase polymerization.

The invention claimed is:

1. A method for producing an olefin polymer, comprising (co)polymerizing at least one olefin selected from the group consisting of ethylene and α-olefins having 3 to 20 carbon atoms in a polymerization vessel in the presence of
(A) a solid catalyst component for olefin polymerization,
(B) an aliphatic amide, and
(C) an organoaluminum compound,
wherein the aliphatic amide (B) and the organoaluminum compound (C) are preliminarily mixed and then added to the polymerization vessel.

2. The method for producing an olefin polymer according to claim 1, wherein the aliphatic amide (B) is represented by general formula (I) below:

$(C_mH_{2m+1}CO)N(CH_2CH_2OH)_2$ (I), in the general formula (I), m denotes an integer of 1 to 30.

3. The method for producing an olefin polymer according to claim 1, wherein the organoaluminum compound (C) is represented by general formula (II) below:

$R^a{}_m Al(OR^b)_n H_p$ (II)

in general formula (II), $R^a$ and $R^b$ each denote a hydrocarbon group having 1 to 20 carbon atoms; m, n and p satisfy the relations: $0 < m \leq 3$; n is $0 \leq n < 3$, p is $0 \leq p < 3$, and $m+n+p=3$.

4. The method for producing an olefin polymer according to claim 1, wherein the molar ratio, (C)/(B), of the organoaluminum compound (C) to the aliphatic amide (B) is 0.01 to 4.0.

5. The method for producing an olefin polymer according to claim 1, wherein the molar ratio, (C)/(B), of the organoaluminum compound (C) to the aliphatic amide (B) is 0.01 to 3.5.

6. The method for producing an olefin polymer according to claim 1, wherein the molar ratio, (C)/(B), of the organoaluminum compound (C) to the aliphatic amide (B) is (C)/(B)= 0.01 to 3.2.

7. The method for producing an olefin polymer according to claim 1, wherein the molar ratio, (C)/(B), of the organoaluminum compound (C) to the aliphatic amide (B) is 0.01 to 3.0.

8. The method for producing an olefin polymer according to claim 1, wherein the molar ratio, (C)/(B), of the organoaluminum compound (C) to the aliphatic amide (B) is 0.2 to 2.8.

9. The method for producing an olefin polymer according to claim 1, wherein the molar ratio, (C)/(B), of the organoaluminum compound (C) to the aliphatic amide (B) is 0.3 to 2.5.

10. The method for producing an olefin polymer according to claim 1, wherein the solid catalyst component for olefin polymerization (A) contains
(A-1) a group 4 transition metal compound having a cyclopentadienyl skeleton,
(A-2) at least one compound selected from
(a) an organometal compound,
(b) an organoaluminoxy compound, and
(c) a compound that forms an ion pair by reacting with (A-1), and
(A-3) a particulate carrier.

11. The method for producing an olefin polymer according to claim 1, wherein the (co)polymerization is conducted in a suspension, a solution, or a gas phase.

* * * * *